United States Patent

Yoshibe et al.

[11] Patent Number: 5,701,209
[45] Date of Patent: Dec. 23, 1997

[54] LENS BARREL HAVING A MANUALLY FOCUSING RING

[75] Inventors: Koushi Yoshibe; Hideo Kanno, both of Chiba, Japan

[73] Assignee: Nikon Corporation, Tokyo, Japan

[21] Appl. No.: 754,088

[22] Filed: Nov. 20, 1996

[30] Foreign Application Priority Data

| Nov. 21, 1995 | [JP] | Japan | 7-302538 |
| Nov. 21, 1995 | [JP] | Japan | 7-302605 |
| Nov. 21, 1995 | [JP] | Japan | 7-302696 |
| Nov. 21, 1995 | [JP] | Japan | 7-302716 |

[51] Int. Cl.$^6$ .............................. G02B 15/14; G03B 1/18
[52] U.S. Cl. ................ 359/823; 359/696; 359/697; 359/698; 396/137
[58] Field of Search ........................ 359/823, 696, 359/697, 698, 701; 396/137, 103

[56] References Cited

U.S. PATENT DOCUMENTS

| 4,456,356 | 6/1984 | Okabe | 396/103 |
| 4,461,544 | 7/1984 | Isobe | 359/698 |
| 4,491,396 | 1/1985 | Isobe | 359/698 |
| 4,956,657 | 9/1990 | Shintani et al. | 396/137 |
| 5,041,855 | 8/1991 | Takezawa et al. | 396/137 |
| 5,420,721 | 5/1995 | Kanno et al. | 359/697 |
| 5,576,894 | 11/1996 | Kuwana et al. | 359/701 |

FOREIGN PATENT DOCUMENTS 6-011636  1/1994  Japan.

Primary Examiner—David C. Nelms
Assistant Examiner—Ricky Mack

[57] ABSTRACT

A lens barrel has a manual focusing ring which is rotatable about the optical axis so as to attain a manual focusing operation, a focusing rotary cylinder which defines the position, in the optical axis direction, of a focusing optical system, and is rotatable about the optical axis, an autofocusing power transmission member for directly transmitting the moving force from an auto-focusing power source to the focusing rotary cylinder, a free rotation cylinder which is arranged on the focusing rotary cylinder, and is rotatable about the optical axis, a manual focusing power transmission member for transmitting the moving force from the manual focusing ring, a power relaying member which constitutes a differential mechanism together with the manual focusing power transmission member and the free rotation cylinder, and applies the rotation driving force to the focusing rotary cylinder by receiving the moving force transmitted from the manual focusing power transmission member, and a locking member for locking the free rotation cylinder in the manual focusing operation.

13 Claims, 11 Drawing Sheets

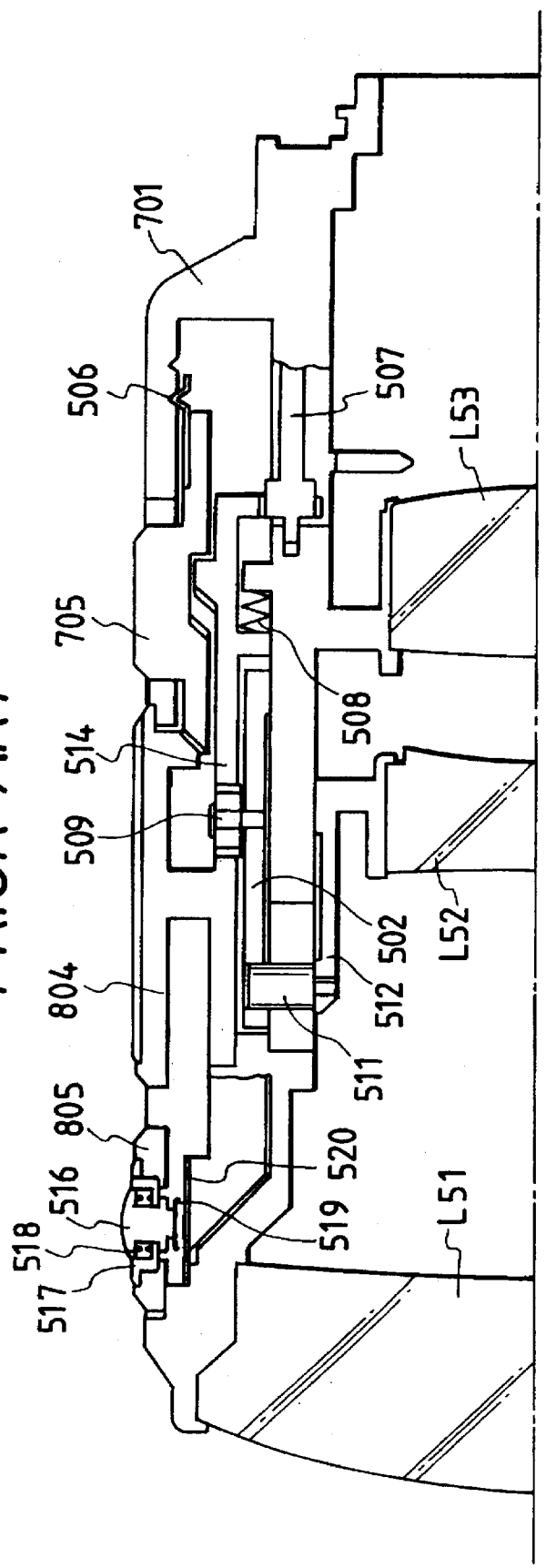

LENS BARREL HAVING A MANUALLY FOCUSING RING

BACKGROUND OF THE INVENTION

1. Field of the Invention

The present invention relates to a lens barrel that can switch between manual and automatic focusing operations.

2. Related Background Art

FIG. 13 is a sectional view showing a conventional barrel in a manual focusing (to be referred to as "MF" hereinafter) mode, and FIG. 14 is a sectional view of the lens barrel in an automatic focusing (to be referred to as "AF" hereinafter) mode. FIG. 16 is a sectional view of a rotary cylinder used in the conventional lens barrel taken along a plane perpendicular to the optical axis. The arrangement of the conventional lens barrel according to the first example will be described below.

The lens barrel shown in FIG. 13 comprises two stationary lens units L61 and L63 held by a stationary cylinder 601, and a focusing lens unit L62 which is arranged between these lens units and is movable in the optical axis direction.

A lens holding cylinder 612 is a member for holding the focusing lens unit L62 on its inner circumferential side, and is fitted in the inner circumferential surface of a small-diameter portion of the stationary cylinder 601 to be movable in the optical axis direction. The lens holding cylinder 612 comprises a cam pin 611 on the outer circumferential surface of its distal end portion. The cam pin 611 extends through a straight groove 601b which is formed on the small-diameter portion of the stationary cylinder 601 and extends parallel to the optical axis, and has its distal end portion inserted in a cam groove 602d formed on a rotary cylinder 602.

The rotary cylinder 602 is a cylindrical member which is arranged on the outer circumferential surface of the small-diameter portion of the stationary barrel 601 to be rotatable about the optical axis, and the cam groove 602d formed on the rotary cylinder 602 is a groove portion for defining the position, in the optical axis direction, of the focusing lens unit L62 via the cam pin 611. The rotary cylinder 602 has an annular projection 602a on its outer circumferential surface, and the annular projection 602a has a plurality of notches 602b arranged on the outer circumferential surface at equal angular intervals in the circumferential direction, as shown in FIG. 16.

A rotary gear shaft 607 is a member for transmitting the driving force of an AF power source (not shown) to the rotary cylinder 602. The rotary gear shaft 607 is arranged so that its rotational axis extends parallel to the optical axis, since its distal end portion 607a is supported in a hole 601a of the stationary cylinder 601. The rotary gear shaft 607 has a gear portion 607b on its front end portion, and the gear portion 607b can mesh with an internal gear 602c formed on the inner circumferential surface of the trailing end portion of the rotary cylinder 602.

A manual focusing ring (to be referred to as an "MF ring" hereinafter) 604 is a cylindrical member which is externally operated in the MF mode, and is arranged on the outer circumferential side of the stationary cylinder 601 to be rotatable about the optical axis. The MF ring 604 comprises a leaf spring member 616 on the inner circumferential surface of its trailing end portion. The MF ring 604 and the rotary cylinder 602 are integrated in the rotational direction when the leaf spring member 616 engages with one of the notches 602b on the rotary cylinder 602.

An A-M switch ring 605 is a member which is rotated by an external operation when the lens barrel is switched between the AF and MF modes. The A-M switch ring 605 is an annular member having a cam groove 605a on its inner circumferential surface, and is equipped on the outer circumferential surface of the stationary cylinder 601 to be rotatable about the optical axis.

A movable member 606 is a member for releasing engagement between the leaf spring member 616 and the notch 602b when it pushes up the leaf spring member 616 by its distal end portion, and is arranged on the inner circumferential surface of a large-diameter portion of the stationary cylinder 601 to be movable backward and forward in the optical axis direction. The movable member 606 comprises a cam pin 617 on its outer circumferential surface, and also comprises an A-M switch member 615 on its rear portion.

The cam pin 617 extends through a straight groove 601c which is formed on the large-diameter portion of the stationary cylinder 601 and extends parallel to the optical axis, and has its distal end portion inserted into the cam groove 605a. Therefore, when the A-M switch ring 605 rotates, the cam pin 617 moves backward or forward in the optical axis direction along the profile of the cam groove 605a, and as a result, the movable member 606 moves together with the cam pin 617.

The A-M switch member 615 is a planar member arranged on the rear portion of the movable member 606. The A-M switch member 615 extends backward in the optical axis direction from the movable member 606, is bent in the direction of the rotary gear shaft 607, and has its distal end portion inserted into a circumferential groove 607c formed on the rotary gear shaft 607. With this arrangement, the movable member 606 and the rotary gear shaft 607 are integrated in the optical axis direction via the A-M switch member 615.

FIGS. 15A and 15B are enlarged views showing the coupled portion between the A-M switch member 615 and the movable member 606. As shown in FIGS. 15A and 15B, the A-M switch member 615 is arranged on the movable member 606 via a spring member 618. The spring member 618 is a torsion spring, is fixed to the A-M switch member 615 by a screw portion 619, and its leg portions are inserted in a hole 606a formed on the movable member 606.

The operation of the conventional lens barrel will be described below.

The operation for switching the lens barrel to the MF mode will be described below with reference to FIG. 13. The conventional lens barrel is switched to the MF mode by rotating the A-M switch ring 605 and adjusting its position to an MF position. At this time, the cam pin 617 moves backward in the optical axis direction along the cam groove 605a upon rotation of the A-M switch ring 605. The motion of the cam pin 617 is transmitted to the rotary gear shaft 607 via the movable member 606 and the A-M switch member 615, and also moves the rotary gear shaft 607 backward in the optical axis direction. As a result, the gear portion 607b and the internal gear 602c release their meshing state, so that the rotation of the rotary gear shaft 607 is not transmitted to the rotary cylinder 602.

On the other hand, the leaf spring member 616 ceases to receive the force from the distal end portion of the movable member 606 and falls into one of the notches 602b of the annular projection 602a since the movable member 606 moves backward in the optical axis direction. As a consequence, the MF ring 604 and the rotary cylinder 602 are integrated in the rotational direction via the leaf spring member 616.

The focusing operation of the lens barrel in the MF mode is attained by rotating the MF ring 604 by an external operation. The rotation of the MF ring 604 is transmitted to the rotary cylinder 602 via the leaf spring member 616. In this case, the rotary cylinder 602 rotates smoothly without being influenced by any stopping torque or the like from the rotary gear shaft 607, since the internal gear 602c does not mesh with the gear portion 607b. Furthermore, the rotation of the rotary cylinder 602 is converted into a rectilinear motion in the optical axis direction by a cam mechanism constituted by the cam pin 611, the cam groove 602d, and the like, and is transmitted to the lens holding cylinder 612. Hence, the lens holding cylinder 612 and the focusing lens unit L62 move backward or forward in the optical axis direction, thus adjusting the focusing state of an optical system (the lens units L61 to L63).

The operation of the lens barrel upon switching the lens barrel to the AF mode will be described below with reference to FIG. 14.

When the lens barrel is used in the AF mode, the A–M switch ring 605 is rotated, and is set at an AF position. With this operation, the cam pin 617 moves forward in the optical axis direction upon rotation of the A–M switch ring 605. Furthermore, the motion of the cam pin 617 is transmitted to the rotary gear shaft 607 via the movable member 606 and the A–M switch member 615, and hence, the rotary gear shaft 607 also moves forward in the optical axis direction. Consequently, the gear portion 607b is located on the inner circumferential side of the internal gear 602c, and meshes with the internal gear 602c.

On the other hand, since the movable member 606 moves forward in the optical axis direction together with the cam pin 617, the leaf spring member 616 is lifted up toward the inner circumferential surface side of the MF ring 604 by the distal end portion of the movable member 606. More specifically, the leaf spring member 616 disengages from the notch 602b of the annular projection 602a, so that the MF ring 604 and the rotary cylinder 602 can move in the rotational direction independently.

When the focusing operation of the lens barrel in the AF mode is to be performed, for example, an AF operation switch on the camera body is turned on, and an AF power source (not shown) supplies the moving force to the rotary gear shaft 607. With this force, the rotary gear shaft 607 rotates, and the rotation is transmitted to the rotary cylinder 602 via the gear portion 607b and the internal gear 602c. Furthermore, the rotation of the rotary cylinder 602 is transmitted to the focusing lens unit L62 via the same route as in the MF mode, thus attaining a focusing operation.

FIG. 17 is a sectional view showing a conventional lens barrel according to the second example, which is different from the lens barrel shown in FIGS. 13, 14, 15A, 15B and 16.

The lens barrel shown in FIG. 17 is different from that shown in FIGS. 13, 14, 15A, 15B and 16 in that a so-called differential mechanism is arranged in a portion for transmitting the moving force from the MF ring or the rotary gear shaft to the rotary cylinder. Hence, the same reference numerals in FIG. 17 denote parts having the same functions as those shown in FIGS. 13, 14, 15A, 15B and 16, a repetitive description thereof will be omitted, and only the arrangement different from that shown in FIG. 13 will be described below.

Each roller 609 is a member for transmitting the moving force of the MF ring 604 or the rotary gear shaft 607 to the rotary cylinder 602. Three rollers 609 are arranged on the outer circumferential surface of the rotary cylinder 602 at equal angular intervals in the circumferential direction, and their side surfaces are sandwiched between an AF gear cylinder 614 and an MF coupling ring 603. Note that the rollers 609, the AF gear cylinder 614, and the MF coupling ring 603 constitute a so-called differential mechanism.

The AF gear cylinder 614 is a cylindrical member for transmitting the rotation of the rotary gear shaft 607 to the rollers 609, and is arranged on the outer circumferential side of the small-diameter portion of the stationary cylinder 601, so that its end portion is in frictional contact with the side surfaces of the rollers 609. The AF gear cylinder 614 has on its inner circumferential surface, a circumferential groove 614b which rounds the cylinder once in the circumferential direction. The circumferential groove 614b receives a pin 613 arranged on the outer circumferential surface of the small-diameter portion of the stationary cylinder 601. With this arrangement, the AF gear cylinder 614 is inhibited by the pin 613 from moving in the optical axis direction, but can perform only rotation about the optical axis. The AF gear cylinder 614 comprises an internal gear 614a on the inner circumferential surface of its trailing end portion. The internal gear 614a meshes with the gear portion 607b of the rotary gear shaft 607. With this arrangement, the rotation of the rotary gear shaft 607 is reliably transmitted to the AF gear cylinder 614.

The MF coupling ring 603 is an annular member for transmitting the rotation of the MF ring 604 to the rollers 609, and is arranged on the inner circumferential surface of the MF ring 604 to be movable in the optical axis direction. A biasing member 608 is an elastic member such as a spring for applying a biasing force for biasing the MF coupling ring 603 backward in the optical axis direction. One end of the biasing member 608 is arranged on the stationary cylinder 601, and the other end thereof is arranged on the MF coupling ring 603. Since the biasing member 608 biases the MF coupling ring 603 backward in the optical axis direction, the MF coupling ring 603 and the rollers 609, and the AF gear cylinder 614 and the rollers 609 reliably contact each other, and their contact surfaces do not slip with respect to each other.

The MF coupling ring 603 has a pin 610 on its outer circumferential surface. The pin 610 has its distal end portion inserted into a straight groove 604a which is formed on the inner circumferential surface of the MF ring 604 and extends parallel to the optical axis. With this arrangement, the MF ring 604 is integrated with the MF coupling ring 603 in the rotational direction.

A case will be explained below wherein the lens barrel shown in FIG. 17 performs an MF operation.

When the MF ring 604 is rotated by an external force, the rotation is transmitted to the MF coupling ring 603 via the pin 610, and the MF coupling 603 rotates together with the MF ring 604. At this time, the AF gear cylinder 614 is substantially fixed in position by the holding torque from an AF power source (not shown) or the frictional force of an AF power transmission system from the AF power source to the AF gear cylinder 614. Therefore, when the rollers 609 receive the rotation from the MF coupling ring 603 on their side surfaces, they move (revolve) around the optical axis along the end face of the AF gear cylinder 614 while rotating about their roller shafts. As a result, the rotary cylinder 602 rotates through a rotation angle ½ that of the MF ring 604, and the focusing lens unit L62 moves in the optical axis direction.

A case will be explained below wherein the lens barrel shown in FIG. 17 performs an AF operation.

In the AF mode, the rotary gear shaft 607 rotates upon reception of the moving force from a power source (not shown). The rotation of the rotary gear shaft 607 is transmitted to the AF gear cylinder 614 via the gear portion 607b and the circumferential groove 614b, and the AF gear cylinder 614 rotates. On the other hand, the MF ring 604 is substantially fixed in the rotational direction owing to the frictional force generated between itself and surrounding members. For this reason, the MF coupling ring 603, which is integrated with the MF ring 604 in the rotational direction, does not rotate, either. Therefore, the rollers 609, in turn, revolve along the end face of the MF coupling ring 603 while rotating by the moving force from the AF gear cylinder 614. Thus, the rotary cylinder 602 rotates through a rotation angle ½ that of the AF gear cylinder 614, and the focusing lens unit L62 is driven in the optical axis direction.

FIGS. 18 and 19 are sectional views showing the conventional arrangements according to the third and fourth examples. In FIGS. 18 and 19, an alternate long and short dashed line indicates the optical axis.

Referring to FIGS. 18 and 19, a stationary member 701 serves as a base portion of the lens barrel. The left side in FIG. 18 or 19 of the stationary member 701 holds a first lens unit L51 as one of lens units of the lens barrel, and the right side in FIG. 18 or 19 has a shape that allows coupling to the camera body.

A selection switch 705 is a switch for switching the focusing mode between an auto-focus (AF) mode and a manual focusing (MF) mode, and is attached to the outer circumferential portion of the lens barrel. A lock leaf spring 506 is attached to the selection switch 705. The lock leaf spring 506 engages with a groove formed on the stationary member 701 to hold the selection switch 705 in position.

An MF ring 704 or 804 is manually rotated about the optical axis to attain the focusing operation in the MF mode, and is attached to the outer circumferential portion of the lens barrel.

A focusing lock button 516 is a button for stopping the focusing operation when it is pressed downward in FIG. 18 or 19. The focusing lock button 516 is arranged in a focusing lock holder 517. The focusing lock button 516 is biased by a biasing spring 518 in the radially outward direction of the lens barrel. A conductive member 519 is attached to the lower side of the focusing lock button 516. Furthermore, an FPC 520 is adhered onto the stationary member 701. With this arrangement, when the focusing lock button is pressed in the direction of the center, the conductive member 519 is brought into contact with the FPC 520, thus setting a focusing lock signal in the ON state.

In the example shown in FIG. 18, the focusing lock button 516 is exposed from a portion of the MF ring 704 to the outer surface. Therefore, the focusing lock button 516 rotates together with the MF ring 704 when the MF ring 704 rotates about the optical axis.

On the other hand, in the example shown in FIG. 19, a rotary member 805 is arranged to be rotatable about the optical axis independently of the MF ring 804. The focusing lock button 516 is exposed from a portion of the rotary member 805 to the outer surface.

A driving force transmission member 507 is rotated in the AF mode, and transmits the driving force transmitted from the camera body side to the lens barrel side. An AF rotary member 514 is rotated about the optical axis by the driving force from the driving force transmission member 507. The driving force transmission member 507 and the AF rotary member 514 are coupled via a gear.

A roller 509 is in frictional contact with the MF ring 704 or 804 and the AF rotary member 514 so as to couple them to each other. The roller 509 is set to prevent the MF ring 704 or 804 and the AF rotary member 514 from slipping.

The roller 509 is rotatably supported by a support shaft. A biasing spring 508 biases the AF rotary member 514 toward the roller 509, so that the MF ring 704 or 804 and the roller 509, and the roller 509 and the AF rotary member 514 are in frictional contact with each other.

A focusing rotary member 502 is rotated about the optical axis in both the AF and MF modes, and is arranged on the inner side of the MF ring 704 or 804 and the AF rotary member 514. The support shaft of the roller 509 is fixed to the focusing rotary member 502. More specifically, the support shafts of three rollers are fixed to the focusing rotary member 502 at equal angular intervals in the circumferential direction. Furthermore, the focusing rotary member 502 is formed with a straight groove extending in the optical axis direction.

Lens units include the first lens unit L51, a second lens unit L52, and a third lens unit L53. Of these lens units, the second lens unit L52 serves as a focusing lens unit, and is arranged between the first and third lens units L51 and L53. The second lens unit L52 moves in the optical axis direction (right-and-left direction in FIG. 18 or 19), thus attaining a focusing operation.

The first and third lens units L51 and L53 are attached to the stationary member 701. The second lens unit L52 is held by a movable frame 512. A pin 511 is fixed to one end of the movable frame 512. A cam groove is formed on the stationary member 701, and the pin 511 extends through the cam groove. The upper end portion of the pin 511 engages with the straight groove of the focusing rotary member 502. Two pins 511 are arranged.

When the selection switch 705 is switched to the AF side (left direction in FIG. 18 or 19), the selection switch 705 is positioned by the lock leaf spring 506 and the groove formed on the stationary member 701, and the left end portion in FIG. 18 or 19 of the selection switch 705 contact the MF ring 704 or 804, thus locking the MF ring 704 or 804. In this state, the driving force is transmitted to the driving force transmission member 507 to rotate it. This rotation is transmitted to the AF rotary member 514 to rotate it about the optical axis. With this rotation, the rollers 509 roll between the AF rotary member 514 and the MF ring 704 or 804 without slipping. Since the rollers 509 themselves move around the optical axis upon rolling of the rollers 509, the focusing rotary member 502 rotates about the optical axis. Note that the MF ring 704 or 804 is kept locked in this state.

With this operation, the pin 511 moves in the optical axis direction by the straight groove of the focusing rotary member 502 and the cam groove of the stationary member 701. Therefore, since the second lens unit L52 moves in the optical axis direction, the relative position between the second lens unit L52, and the first and third lens units L51 and L53 changes, thus attaining a focusing operation.

On the other hand, when the selection switch 705 is switched to the MF side (right direction in FIG. 18 or 19), the selection switch 705 is positioned by the lock leaf spring 506 and the groove formed on the stationary member 701, and the contact state between the selection switch 705 and the MF ring 704 or 804 is released. Instead, the selection switch 705 contacts the AF rotary member 514 to lock the member 514. In this state, when the MF ring 704 or 804 is manually rotated by a photographer, the rollers 509 roll between the MF ring 704 or 804 and the AF rotary member 514 without slipping. At this time, the AF rotary member 514 is kept locked. With this operation, the focusing rotary member 502 rotates as in the AF mode described above, thus attaining a focusing operation.

However, the above-mentioned conventional lens barrels suffer the following problems.

In the lens barrel shown in FIGS. 13, 14, 15A, 15B and 16, the MF ring 604 and the rotary cylinder 602 are integrated in the rotational direction in the MF mode, and the rotary gear shaft 607 directly drives the rotary cylinder 602 in the AF mode. For this reason, in a lens barrel in which the optical system and the power transmission mechanism from the rotary cylinder 602 to the focusing lens holding cylinder 612 are designed while placing an importance on the high-speed AF operation, the moving amount, in the optical axis direction, of the focusing lens unit L62 with respect to unit rotation angle of the MF ring 604 increases, and it becomes difficult to attain a precise MF operation. Conversely, when the lens barrel is designed while placing an importance on MF operability, since the rotation angle of the rotary cylinder upon focusing increases, the focusing speed in the AF mode decreases. Therefore, in the lens barrel shown in FIGS. 13, 14, 15A, 15B and 16, it is difficult to realize a lens barrel with high operability in both the MF and AF modes.

In the conventional lens barrel shown in FIG. 17, since the AF gear cylinder 614 must be substantially fixed in position in the MF mode, a motor having a sufficiently large holding torque must be used as an AF driving source or the AF power transmission system must generate a sufficiently large frictional force. On the other hand, it is required to use an inexpensive, compact DC motor or the like as the AF power source to attain a cost reduction. However, the DC motor or the like generally has a small holding torque and cannot fix the AF gear cylinder 614 in position by itself. On the other hand, when the AF power transmission system is set to generate a relatively large frictional force, since the DC motor or the like can generate a relatively small driving force, it becomes difficult to realize a smooth, high-speed AF operation. For this reason, in the conventional lens barrel shown in FIG. 17, it is difficult to use an inexpensive, compact motor such as a DC motor.

In the conventional lens barrel shown in FIG. 18, when the MF ring 704 is fixed in position in cooperation with the selection switch 705 in the AF mode, the focusing lock button 516 is not always fixed in position where the operator can easily operate the button 516.

In order to solve this problem, a plurality of focusing lock buttons 516 may be arranged on the outer circumferential surface of the MF ring 704. However, such arrangement leads to an increase in cost, and the operability in the MF mode is impaired.

Furthermore, when the focusing lock button 516 is arranged on the rotary member 805 independently of the MF ring 804 as in the conventional lens barrel shown in FIG. 19, the focusing lock button 516 can be located at an arbitrary position independently of the rotation of the MF ring 804, but the number of parts increases, resulting in an increase in cost.

Moreover, since the rotary member 805 is arranged on the outer circumferential portion of the lens barrel, if the focusing lock button 516 is located at a position that assures high operability, the hold feeling of the lens barrel deteriorates.

When the rotary member 805 is fixed in position (not to be rotatable), it is impossible to locate the focusing lock button 516 at positions where every photographer can easily use the button.

SUMMARY OF THE INVENTION

It is an object of the present invention to provide a lens barrel which has high operability in both the MF and AF modes, and can be smoothly operated even by a motor having a small holding torque or a small driving force.

It is another object of the present invention to provide a lens barrel which can locate a focusing lock portion at a desired position in the AF mode without increasing cost.

In order to achieve the above object, according to the first aspect of the present invention, there is provided a lens barrel comprising a manual focusing ring which is rotatable about an optical axis so as to attain a manual focusing operation, a focusing rotary cylinder which defines a position, in an optical axis direction, of a focusing optical system, and is rotatable about the optical axis, an auto-focusing power transmission member for directly transmitting a moving force from an auto-focusing power source to the focusing rotary cylinder, a free rotation cylinder which is arranged on the focusing rotary cylinder, and is rotatable about the optical axis, a manual focusing power transmission member for transmitting a moving force from the manual focusing ring, a power relaying member which constitutes a differential mechanism together with the manual focusing power transmission member and the free rotation cylinder, and applies a rotation driving force to the focusing rotary cylinder by receiving the moving force transmitted from the manual focusing power transmission member, and a locking member for locking the free rotation cylinder in the manual focusing operation.

The locking member preferably locks the free rotation cylinder by being in frictional contact with the free rotation cylinder.

According to the second aspect of the present invention, there is provided a lens barrel comprising a manual focusing ring which is rotatable about an optical axis so as to attain a manual focusing operation, a focusing rotary cylinder which defines a position, in an optical axis direction, of a focusing optical system, and is rotatable about the optical axis, an auto-focusing power transmission member for directly transmitting a moving force from an auto-focusing power source to the focusing rotary cylinder, a free rotation cylinder which is arranged on the focusing rotary cylinder, and is rotatable about the optical axis, a manual focusing power transmission member for transmitting a moving force from the manual focusing ring, a power relaying member which constitutes a differential mechanism together with the manual focusing power transmission member and the free rotation cylinder, and applies a rotation driving force to the focusing rotary cylinder by receiving the moving force transmitted from the manual focusing power transmission member, and a switch member for switching a focusing operation between the manual focusing operation and an auto-focusing operation, wherein the switch member disengages the auto-focus power transmission member and the focusing rotary cylinder and locks the free rotation cylinder when the focusing operation is switched to the manual focusing operation, and the switch member locks the manual focusing power transmission member via the manual focusing ring when the focusing operation is switched to the auto-focusing operation.

Preferably, the switch member is selectively in frictional contact with the free rotation cylinder and the manual focusing ring, thereby locking a corresponding one of the free rotation cylinder and the manual focusing power transmission member.

According to the third aspect of the present invention, there is provided a lens barrel comprising a stationary cylinder for holding a stationary optical system, a manual focusing ring which is rotatable about an optical axis so as to attain a manual focusing operation, a focusing rotary cylinder which defines a position, in an optical axis direction, of a focusing optical system, and is rotatable about the optical axis, an auto-focusing power transmission member for directly transmitting a moving force from an auto-focusing power source to the focusing rotary cylinder, a manual focusing power transmission member for transmitting a moving force from the manual focusing ring, a power relaying member which constitutes a differential mechanism together with the manual focusing power transmission member and the stationary cylinder, and applies a rotation driving force to the focusing rotary cylinder by receiving the moving force transmitted from the manual focusing power transmission member, and a switch member for switching a focusing operation between the manual focusing operation and an auto-focusing operation, wherein the switch member disengages the auto-focus power transmission member and the focusing rotary cylinder when the focusing operation is switched to the manual focusing operation, and the switch member disengages the manual focusing power transmission member and the power relaying member from each other by biasing the manual focusing power transmission member when the focusing operation is switched to the auto-focusing operation.

Preferably, the manual focusing power transmission member is movable relative to the manual focusing ring in the optical axis direction, and the switch member disengages the manual focusing power transmission member and the power relaying member from each other by biasing the manual focusing power transmission member in the optical axis direction.

According to the fourth aspect of the present invention, there is provided a lens barrel comprising a manual focusing ring which is rotatable about an optical axis so as to attain a manual focusing operation, a focusing rotary cylinder which defines a position, in an optical axis direction, of a focusing optical system, and is rotatable about the optical axis, a manual focusing power transmission member for transmitting a moving force from the manual focusing ring, an auto-focusing power transmission member for transmitting a moving force from an auto-focusing power source, a power relaying member which constitutes a differential mechanism together with the manual focusing power transmission member and the auto-focusing power transmission member, and applies a rotation driving force to the focusing rotary cylinder by receiving the moving forces transmitted from the manual focusing power transmission member and the auto-focusing power transmission member, and a switch member for switching a focusing operation between the manual focusing operation and an auto-focusing operation, wherein the switch member locks the auto-focusing power transmission member when the focusing operation is switched to the manual focusing operation, and the switch member locks the manual focusing power transmission member via the manual focusing ring when the focusing operation is switched to the auto-focusing operation.

Preferably, the switch member is selectively in frictional contact with the auto-focusing power transmission member and the manual focusing ring, thereby locking a corresponding one of the auto-focusing power transmission member and the manual focusing power transmission member. Also, the manual focusing ring and the manual focusing power transmission member may be integrally formed.

According to the fifth aspect of the present invention, there is provided a lens barrel comprising a manual focusing ring which is rotatable about an optical axis so as to attain a manual focusing operation, a focusing rotary cylinder which defines a position, in an optical axis direction, of a focusing optical system, and is rotatable about the optical axis, a focusing lock member which is arranged on the manual focusing ring, is rotatable together with the manual focusing ring upon rotation of the manual focusing ring, and holds a focusing state, and a switch member for switching a focusing operation between the manual focusing operation and an auto-focusing operation, wherein when the focusing operation is switched to the auto-focusing operation, the manual focusing ring is not rotated by the auto-focusing operation, and is manually rotatable.

The lens barrel preferably further comprises a manual focusing power transmission member which is in frictional contact with the manual focusing ring to be rotatable about the optical axis, is rotatable together with the manual focusing ring by a frictional contact force with the manual focusing ring when the focusing operation is switched to the manual focusing operation, and is locked to make only the manual focusing ring rotatable when the focusing operation is switched to the auto-focusing operation. Furthermore, the lens barrel preferably further comprises an auto-focusing power transmission means which is rotated about the optical axis when the focusing operation is switched to the auto-focusing operation, and is locked when the focusing operation is switched to the manual focusing operation, and a power relaying member which constitutes a differential mechanism together with the manual focusing power transmission member and the auto-focusing power transmission member, and applies a rotation driving force to the focusing rotary cylinder by receiving the moving forces from the manual focusing power transmission member and the auto-focusing power transmission member.

Preferably, the power relaying member is in frictional contact with the manual focusing power transmission member and the auto-focusing power transmission member, and rolls around the optical axis without slipping with respect to the manual focusing power transmission member and the auto-focusing power transmission member when one of the manual focusing power transmission member and the auto-focusing power transmission member is rotated.

The above and other objects, features and advantages of the present invention will be explained hereinafter and may be better understood by reference to the drawings and the descriptive matter which follows.

BRIEF DESCRIPTION OF THE DRAWINGS

FIG. 19 is a sectional view showing a conventional lens barrel according to the fourth example.

DETAILED DESCRIPTION OF THE PREFERRED EMBODIMENTS

Figure 1:
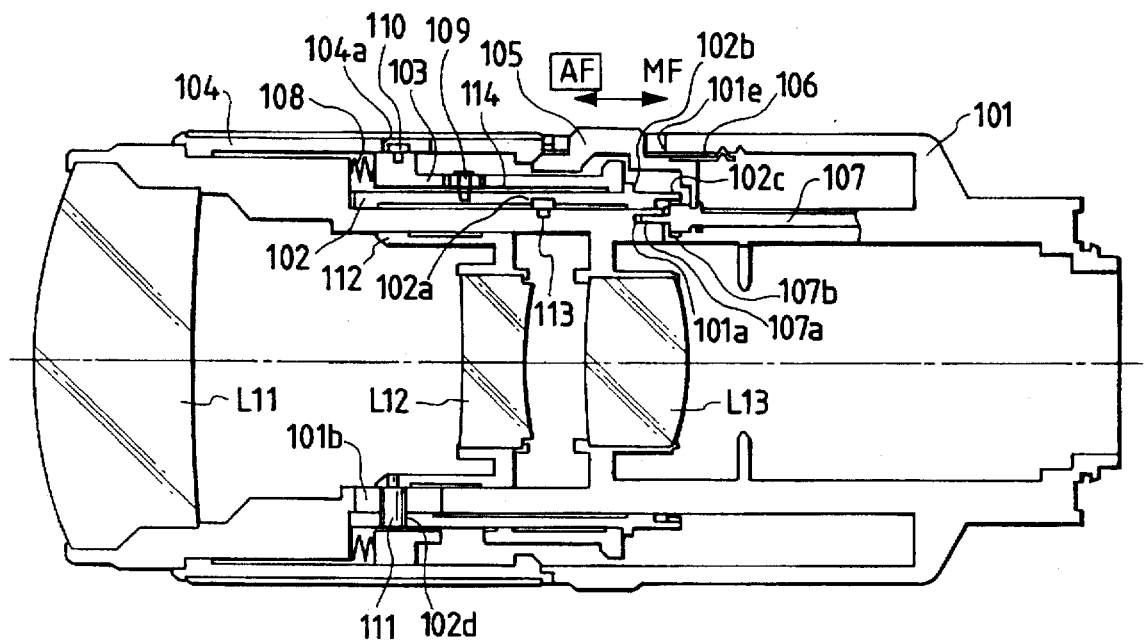
FIG. 1 is a sectional view showing a lens barrel in the AF mode according to the first embodiment of the present invention.
Figure 2:
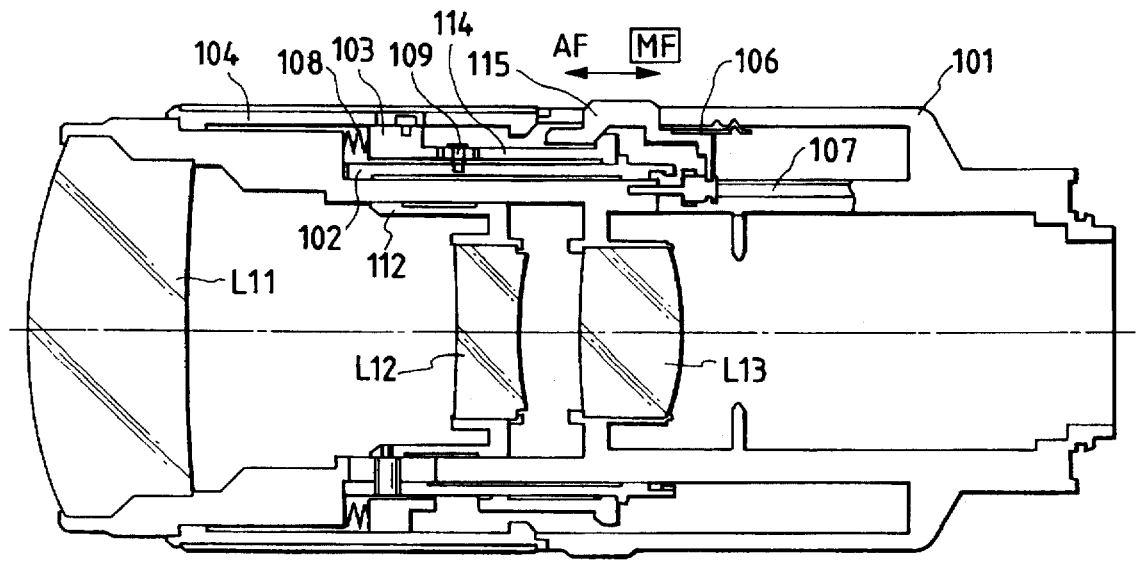
FIG. 2 is a sectional view showing the lens barrel in the MF mode according to the first embodiment of the present invention.

Referring to FIGS. 1 and 2, a lens barrel according to the first embodiment of the present invention comprises two stationary lens units L11 and L13 held by a stationary cylinder 101, and a focusing lens unit L12 which is located between these lens units and is movable in the optical axis direction.

A lens holding cylinder 112 is a member for holding the focusing lens unit L12 on its inner circumferential side, and is fitted in the inner circumferential surface of a small-diameter portion of the stationary cylinder 101 to be movable in the optical axis direction.

A rotary cylinder 102 is a cylindrical member which is arranged on the outer circumferential surface of the small-diameter portion of the stationary cylinder 101. The rotary cylinder 102 comprises a cam groove 102d that defines the position, in the optical axis direction, of the focusing lens unit L12, and also has a groove portion 102a on its inner circumferential surface and a projection 102b on the outer circumferential surface of its trailing end portion. Since a pin 113 which is arranged on the outer circumferential surface of the small-diameter portion of the stationary cylinder 101 has its distal end portion inserted into the groove portion 102a, the rotary cylinder 102 can perform only rotation about the optical axis.

A cam pin 111 is arranged on the outer circumferential surface of the distal end portion of the lens holding cylinder 112, extends through a straight groove 101b, which is formed on the small-diameter portion of the stationary cylinder 101 and extends parallel to the optical axis, and has its distal end portion inserted into the cam groove 102d.

Therefore, the cam pin 111 moves in the optical axis direction along the profile of the cam groove 102d upon rotation of the rotary cylinder 102, thus driving the lens holding cylinder 112.

A roller 109 is a member for transmitting the moving force from an MF coupling ring 103 or a free rotation cylinder 114 (to be described later) to the rotary cylinder 102, and three rollers are arranged on the outer circumferential surface of the rotary cylinder 102 at equal angular intervals in the circumferential direction. The side surfaces, on the front and rear sides in the optical axis direction, of the rollers 109 are sandwiched between the MF coupling ring 103 and the free rotation cylinder 114. Hence, the rollers 109, the MF coupling ring 103, and the free rotation ring 114 constitute a so-called differential mechanism.

The free rotation cylinder 114 is a cylindrical member arranged on the outer circumferential surface of the rotary cylinder 102. The distal end portion of the cylinder 114 is supported by the rollers 109, and the trailing end portion thereof is supported by the projection 102b of the rotary cylinder 102. Therefore, the free rotation cylinder 114 does not move backward or forward in the optical axis direction, and performs only rotation about the optical axis. Since the distal end portion of the free rotation cylinder 114 is in frictional contact with the side surfaces of the rollers 109, when the free rotation cylinder 114 rotates, the rollers 109 rotate about their roller shafts.

A rotary gear shaft 107 is a member for transmitting the moving force from an AF power source (not shown) such as a DC motor or the like. The rotary gear shaft 107 is arranged so that its rotational axis extends parallel to the optical axis, since its distal end portion 107a is supported in a hole 101a of the stationary cylinder 101. The rotary gear shaft 107 has a gear portion 107b on its front end portion, and the gear portion 107b can mesh with an internal gear 102c formed on the inner circumferential surface of the trailing end portion of the rotary cylinder 102.

An MF ring 104 is a cylindrical member rotated by an external operation in the MF mode, and is arranged on the outer circumferential side of the stationary cylinder 101 to be rotatable about the optical axis.

The MF coupling ring 103 is a member which is arranged on the inner circumferential surface of the MF ring 104 to be movable in the optical axis direction. The MF coupling ring 103 comprises a pin 110 on its outer circumferential surface, and the distal end portion of the pin 110 is inserted into a straight groove 104a. Note that the straight groove 104a is a groove portion formed on the inner circumferential surface of the MF ring 104 and extends parallel to the optical axis. Therefore, the MF ring 104 and the MF coupling ring 103 are integrated in the rotational direction. The rear end face of the MF coupling ring 103 is in frictional contact with the side surfaces of the rollers 109. Hence, when the MF coupling ring 103 rotates, the rollers 109 rotate about their roller shafts.

A biasing member 108 is an elastic member such as a spring for applying the biasing force for biasing the MF coupling ring 103 backward in the optical axis direction. One end of the biasing member 108 is arranged on the stationary cylinder 101, and the other end thereof is arranged on the MF coupling ring 103. With this arrangement, since the biasing member 108 biases the MF coupling ring 103 backward in the optical axis direction, the MF coupling ring 103 and the rollers 109, and the free rotation cylinder 114 and the rollers 109 reliably contact each other, and their contact surfaces do not slip with respect to each other.

Figure 3:
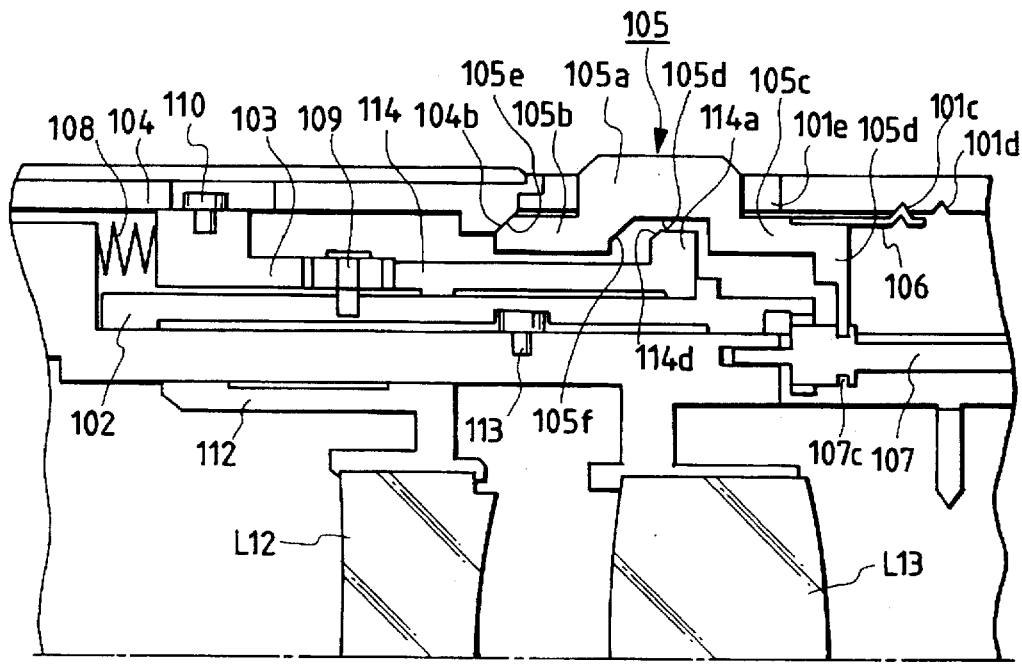
FIG. 3 is a partially enlarged sectional view of the lens barrel shown in FIG. 1.

FIG. 3 is an enlarged sectional view of a portion including an A–M switch member 105 shown in FIG. 1. The A–M switch member 105 is a member which is slid backward or forward in the optical axis direction by an external operation when the focusing mode is switched between the AF and MF modes. The A–M switch member 105 has a projection 105a, extended portions 105b and 105c respectively extending backward and forward in the optical axis direction, and a groove portion 105d formed in the lower surface of the projection 105a.

The projection 105a is inserted into a vertical hole 101e, which is formed on the stationary cylinder 101 to extend parallel to the optical axis, from the inner circumferential surface side. With this arrangement, the moving direction of the A–M switch member 105 is limited to the optical axis direction.

A lock member 106 is arranged on the rear portion of the extended portion 105c. The lock member 106 consists of an elastic member such as a leaf spring or the like, and has one projection. The lock member 106 locks the position, in the optical axis direction, of the A–M switch member 105 when its projection is fitted in one of groove portions 101c and 101d. Note that the groove portions 101c and 101d are formed on the inner circumferential surface of a large-diameter portion of the stationary cylinder 101 to be juxtaposed in the optical axis direction. When the projection of the lock member 106 is fitted in the groove portion 101d, the A–M switch member 105 is locked at the rear position in the optical axis direction, and a surface 105f of a groove portion 105d is in frictional contact with a surface 114d of a projection 114a. On the other hand, when the projection of the lock member 106 is fitted in the groove portion 101c, the A–M switch member 105 is locked at the front position in the optical axis direction, and a surface 105e of the extended portion 105b is in frictional contact with a rear end face 104b of the MF ring 104.

Furthermore, the extended portion 105c comprises, on its trailing end portion, a support portion 105d extending toward the rotary gear shaft 107. The support portion 105d has its distal end portion inserted into a circumferential groove 107c formed on the rotary gear shaft 107. With this arrangement, the A–M switch member 105 and the rotary gear shaft 107 are integrated in the optical axis direction.

The focusing operation in the AF mode according to the first embodiment will be described below with reference to FIG. 1.

In the AF mode, the A–M switch member 105 is located at the front position in the optical axis direction by a manual operation, and the projection of the lock member 106 is fitted into the groove portion 101c. In this state, the surface 105c of the extended portion 105b is in frictional contact with the surface 104b of the MF ring 104, and the MF ring 104 is fixed in position in the rotational direction. Hence, according to this embodiment, even when the photographer inadvertently touches the MF ring 104 and applies a force thereto, the AF operation can be prevented from being disturbed. On the other hand, since the rotary gear shaft 107 moves forward in the optical axis direction together with the A–M switch member 105, the gear portion 107b of the rotary gear shaft 107 meshes with the internal gear 102c of the rotary cylinder 102.

Subsequently, an AF switch (not shown) arranged on the camera body side is turned on, and an AF power source (not shown) applies the moving force to the rotary gear shaft 107 to rotate it. The rotation of the rotary gear shaft 107 is transmitted to the rotary cylinder 102 via the gear portion 107b and the internal gear 102c, thus rotating the rotary cylinder 102.

At this time, the rollers 109 move (revolve) around the optical axis together with the rotary cylinder 102. At the same time, since the MF coupling ring 103 is integrated with the MF ring 104 in the optical axis direction and does not rotate, the rollers 109 rotate along the rear end face of the MF coupling ring 103. On the other hand, since the free rotation cylinder 114 is in the free rotation state, it rotates upon reception of the motion as a combination of the rotation and revolution of the rollers 109 from the contact surfaces with the rollers 109. Therefore, the motions of the rollers 109 are never disturbed by the free rotation cylinder 114.

The rotation of the rotary cylinder 102 is converted into a rectilinear motion in the optical axis direction by a cam mechanism constituted by the cam pin 111, the cam groove 102d, and the like, and is transmitted to the lens holding cylinder 112. As a result, the lens holding cylinder 112 and the focusing lens unit L12 move backward or forward in the optical axis direction, thus attaining a focusing operation of the optical system.

The focusing operation in the MF mode according to the first embodiment will be described below with reference to FIG. 2.

When the lens barrel of the first embodiment is in the MF mode, the A–M switch member 105 is located at the rear position in the optical axis direction, and the projection of the lock member 106 is fitted into the groove portion 101d. Since the surface 105f of the groove portion 105d is in frictional contact with the surface 114d of the free rotation cylinder 114, the free rotation cylinder 114 is fixed in position in the rotational direction. Furthermore, since the rotary gear shaft 107 moves backward in the optical axis direction together with the A–M switch member 105, the gear portion 107b of the rotary gear shaft 107 is released from the meshing state with the internal gear 102c of the rotary cylinder 102, so that the rotary gear shaft 107 and the rotary cylinder 102 can move independently of each other. Hence, no load from the AF power transmission system acts on the rotary cylinder 102, resulting in light operation feeling of the MF ring 104.

When the MF ring 104 is rotated by an external operation, the rotation of the MF ring 104 is transmitted to the MF coupling ring 103 via the pin 110, and the MF coupling ring 103 rotates together with the MF ring 104. The rotation of the MF coupling ring 103 is further transmitted to the rollers 109 to rotate them about their roller shafts. On the other hand, since the free rotation cylinder 114 is fixed in position in the rotational direction by the A–M switch member 105, as described above, the rotating rollers 109 move along the front end face of the free rotation cylinder 114, and move (revolve) around the optical axis. Since the rollers 109, the MF coupling ring 103, and the free rotation cylinder 114 constitute a differential mechanism, as has already been described above, the rollers 109 revolve through an angle ½ the rotation angle of the MF coupling ring 103.

Thereafter, the revolution of the rollers 109 is transmitted to the rotary cylinder 102, and is then transmitted to the focusing lens unit L12 via the same route as that described in the AF mode, thus attaining a focusing operation.

As described above, according to the first embodiment, the focusing mode can be easily switched between the AF and MF modes by sliding the A–M switch member 105 backward or forward in the optical axis direction.

When the focusing mode is switched to the MF mode, the A–M switch member 105 fixes the free rotation cylinder 114 in the rotational direction, and hence, the MF coupling ring 103, the rollers 109, and the free rotation cylinder 114 constitute a differential mechanism. As a result, since the rotation of the MF ring 104 is transmitted to the rotary cylinder 102 via the differential mechanism while being enlarged in its rotation angle, a precise focusing operation can be easily attained in this embodiment.

Since the differential mechanism is constituted independently of the AF power transmission system, the lens barrel of the first embodiment requires neither an increase in frictional force of the AF power transmission system nor using a motor with a large holding torque in the AF power source, so as to operate the differential mechanism. As a consequence, in the first embodiment, even when a DC motor or the like, which has a small holding torque, driving force, or the like, is used, smooth operations are assured in both the AF and MF modes.

On the other hand, when the focusing mode is switched to the AF mode, the A–M switch member 105 directly transmits the moving force from the AF power source to the rotary cylinder 102 without going through the differential mechanism, since the gear portion 107b meshes with the internal gear 102c. Therefore, in the first embodiment, a high-speed AF operation can be realized while assuring good operability in the MF mode.

Figure 4:
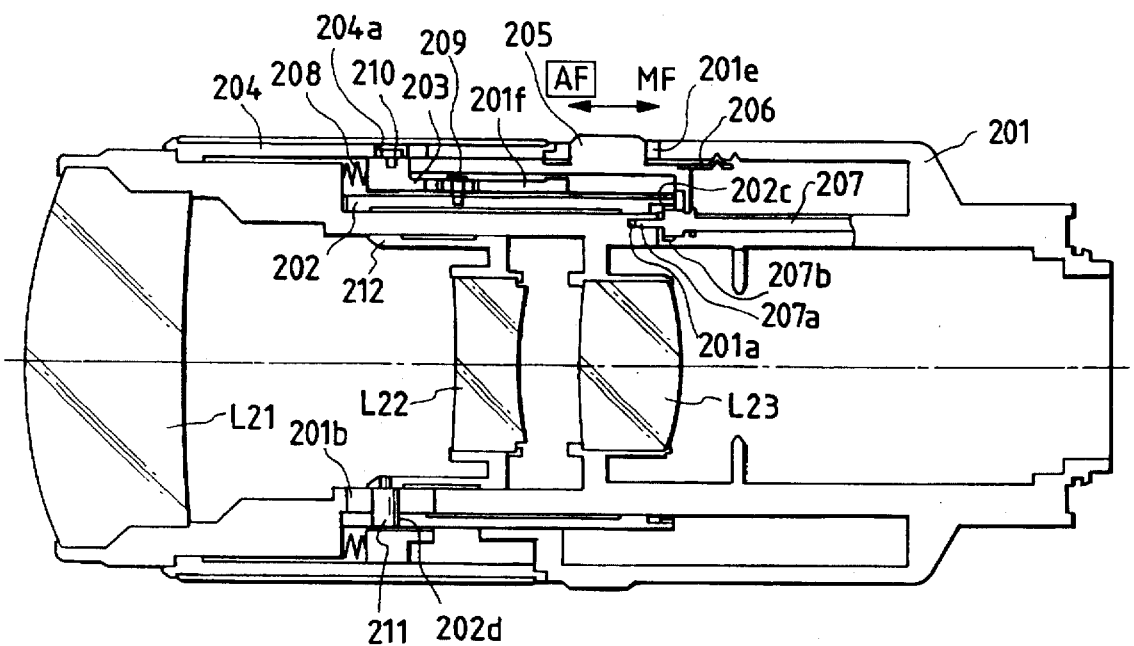
FIG. 4 is a sectional view showing a lens barrel in the AF mode according to the second embodiment of the present invention.
Figure 5:
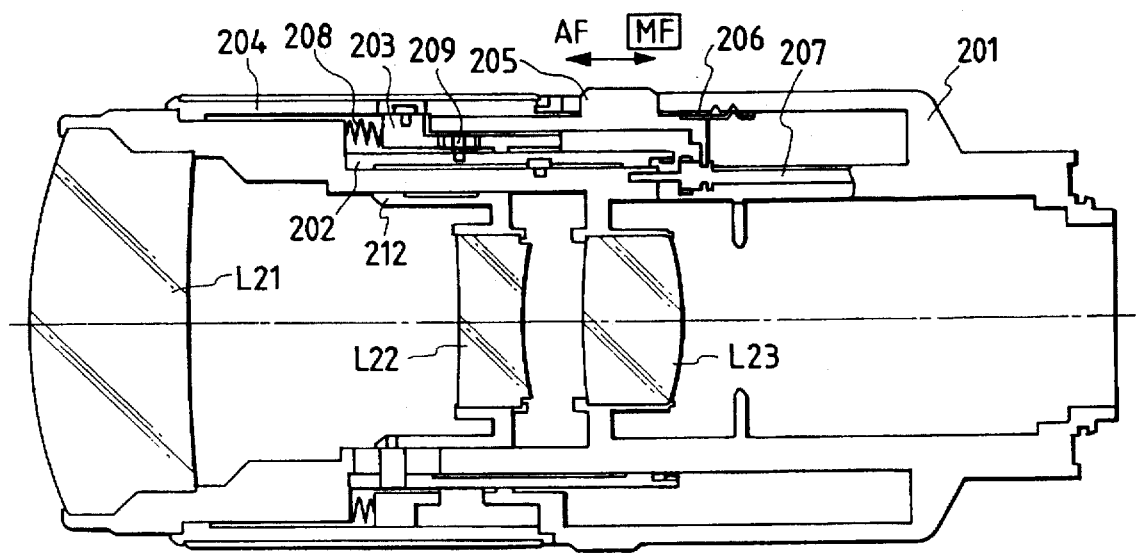
FIG. 5 is a sectional view showing the lens barrel in the MF mode according to the second embodiment of the present invention.

Referring to FIGS. 4 and 5, a lens barrel according to the second embodiment of the present invention comprises two stationary lens units L21 and L23 held by a stationary cylinder 201, and a focusing lens unit L22 which is located between these lens units, and is movable in the optical axis direction.

A lens holding cylinder 212 is a member for holding the focusing lens unit L22 on its inner circumferential side, and is fitted in the inner circumferential surface of a small-diameter portion of the stationary cylinder 201 to be movable in the optical axis direction.

A rotary cylinder 202 is a cylindrical member which is arranged on the outer circumferential surface of the small-diameter portion of the stationary cylinder 201 to be rotatable about the optical axis. The rotary cylinder 202 comprises a cam groove 202d that defines the position, in the optical axis direction, of the focusing lens unit L22.

A cam pin 211 is arranged on the outer circumferential surface of the distal end portion of the lens holding cylinder 212, extends through a straight groove 201b, which is formed on the small-diameter portion of the stationary cylinder 201 and extends parallel to the optical axis, and has its distal end portion inserted into the cam groove 202d. Therefore, the cam pin 211 moves in the optical axis direction along the profile of the cam groove 202d upon rotation of the rotary cylinder 202, thus driving the lens holding cylinder 212.

A roller 209 is a member for transmitting the moving force from an MF coupling ring 203 (to be described later) to the rotary cylinder 202, and three rollers are arranged on the outer circumferential surface of the rotary cylinder 202 at equal angular intervals in the circumferential direction. The side surfaces, on the front and rear sides in the optical axis direction, of the rollers 209 are sandwiched between the MF coupling ring 203 and a roller support portion 201f of the stationary cylinder 201. Hence, the rollers 209, the MF coupling ring 203, and the roller support portion 201f constitute a so-called differential mechanism. Note that the roller support portion 201f is a portion of the stationary cylinder 201, which extends from the large-diameter portion of the stationary cylinder 201 toward the inner circumferential surface side, and its front surface in the optical axis direction is in frictional contact with the side surfaces of the rollers 209.

A rotary gear shaft 207 is a member for transmitting the moving force from an AF power source (not shown) such as a DC motor or the like. The rotary gear shaft 207 is arranged so that its rotation axis extends parallel to the optical axis, since its distal end portion 207a is supported in a hole 201a of the stationary cylinder 201. On the other hand, the rotary gear shaft 207 has a gear portion 207b on its front portion, and the gear portion 207b can mesh with an internal gear 202c formed on the inner circumferential surface of the trailing end portion of the rotary cylinder 202.

An MF ring 204 is a cylindrical member rotated by an external operation in the MF mode, and is arranged on the outer circumferential side of the stationary cylinder 201 to be rotatable about the optical axis.

The MF coupling ring 203 is a member which is arranged on the inner circumferential surface of the MF ring 204 to be movable in the optical axis direction. The MF coupling ring 203 comprises a pin 210 on its outer circumferential surface, and the distal end portion of the pin 210 is inserted into a straight groove 204a. Note that the straight groove 204a is a groove portion formed on the inner circumferential surface of the MF ring 204 and extends parallel to the optical axis. Therefore, the MF ring 204 and the MF coupling ring 203 are integrated in the rotational direction. The rear end face of the MF coupling ring 203 is in frictional contact with the side surfaces of the rollers 209. Hence, when the MF coupling ring 203 rotates, the rollers 209 rotate about their roller shafts.

A biasing member 208 is an elastic member such as a spring for applying the biasing force for biasing the MF coupling ring 203 backward in the optical axis direction. One end of the biasing member 208 is arranged on the stationary cylinder 201, and the other end thereof is arranged on the MF coupling ring 203. With this arrangement, since the biasing member 208 biases the MF coupling ring 203 backward in the optical axis direction, the MF coupling ring 203 and the rollers 209 reliably contact each other, and their contact surfaces do not slip with respect to each other.

Figure 6:
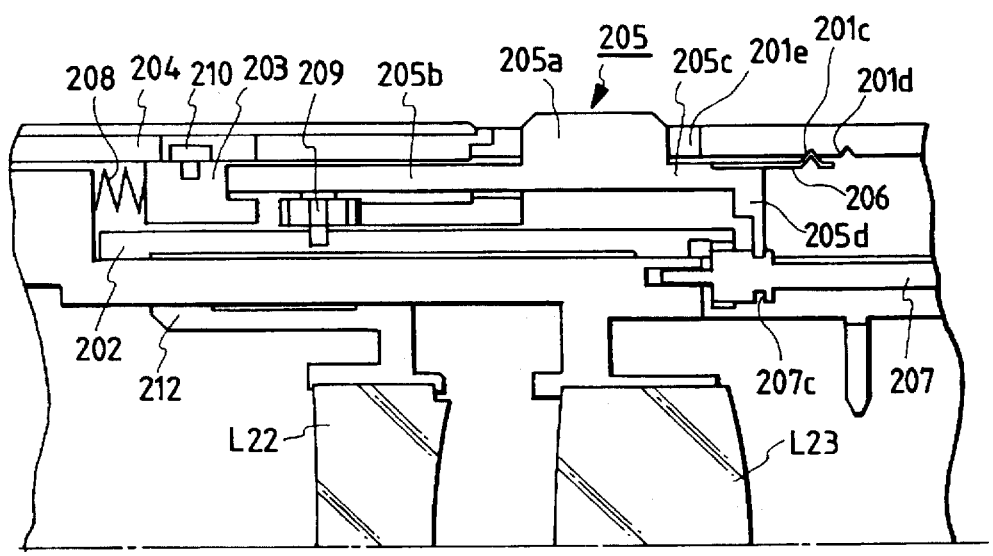
FIG. 6 is a partially enlarged sectional view of the lens barrel shown in FIG. 4.

FIG. 6 is an enlarged sectional view of a portion including an A–M switch member 205 shown in FIG. 4. The A–M switch member 205 is a member which is slid backward or forward in the optical axis direction by an external operation when the focusing mode is switched between the AF and MF modes. The A–M switch member 205 has a projection 205a, and extended portions 205b and 205c respectively extending backward and forward in the optical axis direction. The projection 205a is inserted into a vertical hole 201e, which is formed on the stationary cylinder 201 to extend parallel to the optical axis, from the inner circumferential surface side. With this arrangement, the moving direction of the A–M switch member 205 is limited to the optical axis direction.

On the other hand, the extended portion 205c comprises, on its trailing end portion, a support portion 205d extending toward the rotary gear shaft 207. The support portion 205d has its distal end portion inserted into a circumferential groove 207c formed on the rotary gear shaft 207. With this arrangement, the A–M switch member 205 and the rotary gear shaft 207 are integrated in the optical axis direction.

Furthermore, a lock member 206 is arranged on the rear portion of the extended portion 205c. The lock member 206 consists of an elastic member such as a leaf spring or the like, and has one projection. The lock member 206 locks the position, in the optical axis direction, of the A–M switch member 205 when its projection is fitted in one of groove portions 201c and 201d. Note that the groove portions 201c and 201d are formed on the inner circumferential surface of the large-diameter portion of the stationary cylinder 201 to be juxtaposed in the optical axis direction.

When the projection of the lock member 206 is fitted in the groove portion 201c, the A–M switch member 205 is locked at the front position in the optical axis direction. With this operation, the rotary gear shaft 207 is located at the front position in the optical axis direction, and the gear portion 207b meshes with the internal gear 202c. At the same time, the extended portion 205b biases the rear surface of the MF coupling ring 203. Accordingly, the MF coupling ring 203 moves forward in the optical axis direction, and the MF coupling ring 203 is separated from the rollers 209.

On the other hand, when the projection of the lock member 206 is fitted in the groove portion 201d, the A–M switch member 205 is locked at the rear position in the optical axis direction. At this time, the rotary gear shaft 207 is located at the rear position in the optical axis direction, and the gear portion 207b and the internal gear 202c release their meshing state. On the other hand, the extended portion 205b does not bias the MF coupling ring 203c, and the rear end face of the MF coupling ring 203 comes into contact with the rollers 209 since the ring 203 is biased by the biasing member 208.

The focusing operation in the AF mode according to the second embodiment will be described below with reference to FIG. 4.

In the AF mode, since the A–M switch member 205 is located at the front position in the optical axis direction by a manual operation, the projection of the lock member 206 is fitted into the groove portion 201c. The MF coupling ring 203 is biased by the extended portion 205b, and is moved to the front position in the optical axis direction. For this reason, the MF coupling ring 203 and the rollers 209 do not contact each other. On the other hand, since the rotary gear shaft 207 moves forward in the optical axis direction together with the A–M switch member 205, the gear portion 207b of the rotary gear shaft 207 meshes with the internal gear 202c of the rotary cylinder 202, and the moving force of the rotary gear shaft 207 can be transmitted to the rotary cylinder 202.

When an AF switch (not shown) arranged on the camera body side is turned on, the AF power source (not shown) applies the moving force to the rotary gear shaft 207 to rotate it. The rotation of the rotary gear shaft 207 is transmitted to the rotary cylinder 202 via the gear portion 207b and the internal gear 202c, thus rotating the rotary cylinder 202. At the same time, the rollers 209 move (revolve) around the optical axis together with the rotary cylinder 202. Since the MF coupling ring 203 does not contact the rollers 209, the frictional force or the like in the rotational direction generated by the MF coupling ring 203 or the MF ring 203 is not transmitted to the rollers 209. Therefore, the rotary cylinder 202 performs a smooth, quick AF operation by a small driving force.

The rotation of the rotary cylinder 202 is converted into a rectilinear motion in the optical axis direction by a cam mechanism constituted by the cam pin 211, the cam groove 202d, and the like, and is transmitted to the lens holding cylinder 212. As a result, the lens holding cylinder 212 and the focusing lens unit L12 move backward or forward in the optical axis direction, thus attaining the focusing operation of the optical system.

The focusing operation in the MF mode according to the second embodiment will be described below with reference to FIG. 5.

When the lens barrel of the second embodiment is in the MF mode, the A–M switch member 205 is located at the rear position in the optical axis direction, and the projection of the lock member 206 is fitted into the groove portion 201d. Since the extended portion 205b moves backward in the optical axis direction upon movement of the A–M switch member 205, the MF coupling ring 203 is biased backward in the optical axis direction by only the biasing member 208, and comes into contact with the rollers 209. Therefore, the rotation of the MF ring 204 is transmitted to the rotary cylinder 202 via the MF coupling ring 203 and the rollers 209.

On the other hand, since the rotary gear shaft 207 moves backward in the optical axis direction together with the A–M switch member 205, the gear portion 205b of the rotary gear shaft 207 is released from the meshing state with the internal gear 202c, so that the rotary gear shaft 207 and the rotary cylinder 202 can move independently of each other. Therefore, no load from the AF power transmission system acts on the rotary cylinder 202, and the MF ring 204 can be smoothly operated by a small rotation torque.

When the MF ring 204 is rotated by an external operation, the rotation of the MF ring 204 is transmitted to the MF coupling ring 203 via the pin 210, and the MF coupling ring 203 rotates together with the MF ring 204. Furthermore, the rotation of the MF coupling ring 203 is transmitted to the rollers 209 to rotate them about their roller shafts. At the same time, the rollers 209 roll along the end face of the roller support portion 201f, and move (revolve) around the optical axis. Since the rollers 209, the MF coupling ring 203, and the roller support portion 201f constitute a so-called differential mechanism, the rollers 209 revolve through an angle ½ the rotation angle of the MF coupling ring 203.

Thereafter, the revolution of the rollers 209 is transmitted to the rotary cylinder 202, and is then transmitted to the focusing lens unit L22 via the same route as described in the AF mode, thus attaining a focusing operation.

As described above, according to the second embodiment, the focusing mode can be easily switched between the AF and MF modes by sliding the A–M switch member 205 backward or forward in the optical axis direction.

When the focusing mode is switched to the MF mode, the A–M switch member 205 allows the contact state between the MF coupling ring 203 and the rollers 209 since it does not bias the MF coupling ring 203. With this operation, the MF coupling ring 203, the rollers 209, and the roller support portion 201b constitute a differential mechanism, and the rotation of the MF ring 204 is transmitted to the rotary cylinder 202 via the differential mechanism while being enlarged in its rotation angle. As a result, in this embodiment, a precise focusing operation can be easily attained in the MF mode.

The differential mechanism does not include any constituting members of the AF power transmission mechanism such as the rotary gear shaft 207. More specifically, the second embodiment requires neither an increase in frictional force of the AF power transmission system nor using a motor with a large holding torque in the AF power source, so as to operate the differential mechanism. As a result, in the second embodiment, even when a DC motor or the like, which has a small holding torque, driving force, or the like, is used, smooth operations are assured in both the AF and MF modes.

Furthermore, when the focusing mode is switched to the AF mode, the A–M switch member 205 directly transmits the moving force from the AF power source to the rotary cylinder 202 without going through the differential mechanism since its gear portion 207b meshes with the internal gear 202c. Therefore, in the second embodiment, the high-speed AF operation can be realized while assuring good operability in the MF mode.

Figure 7:
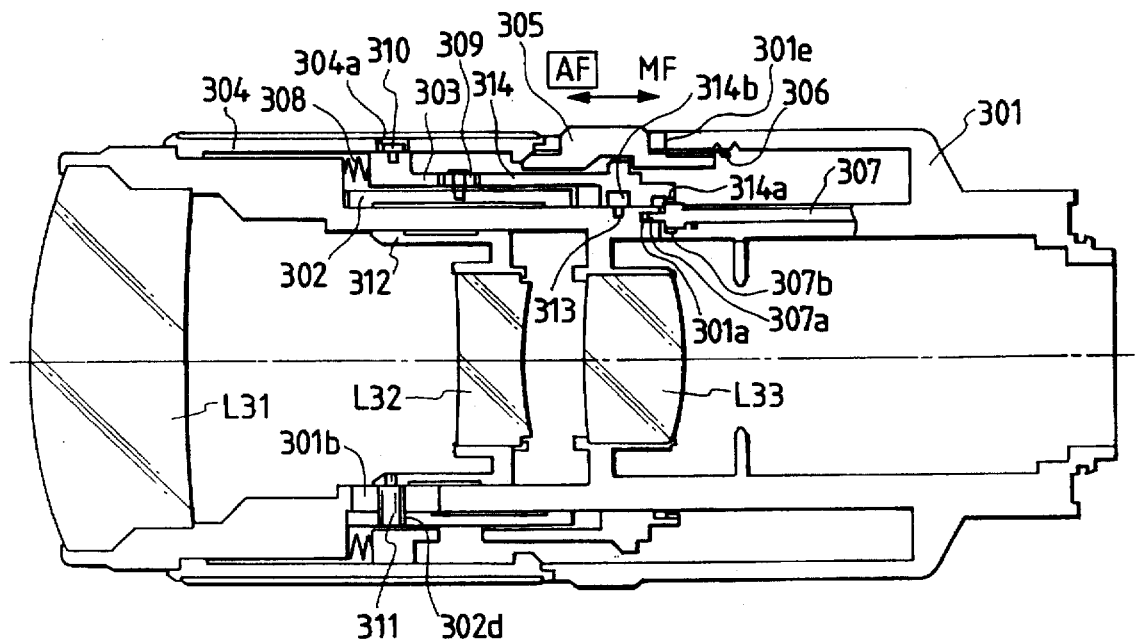
FIG. 7 is a sectional view showing a lens barrel in the AF mode according to the third embodiment of the present invention.
Figure 8:
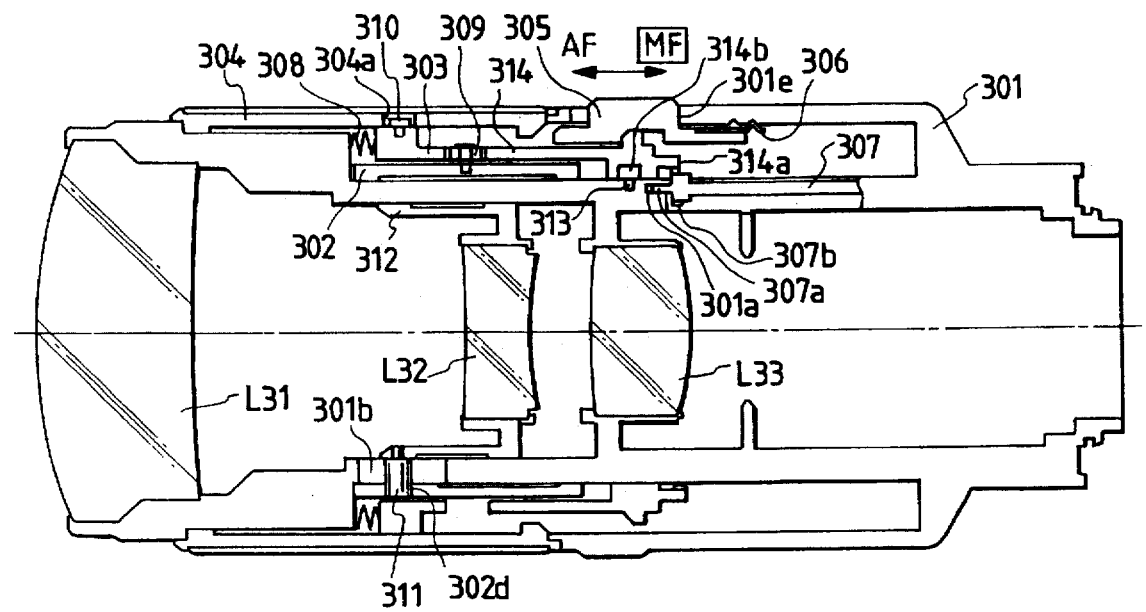
FIG. 8 is a sectional view showing the lens barrel in the MF mode according to the third embodiment of the present invention.

Referring to FIGS. 7 and 8, a lens barrel according to the third embodiment of the present invention comprises two stationary lens units L31 and L33 held by a stationary cylinder 301, and a focusing lens unit L32 which is located between these lens units, and is movable in the optical axis direction.

A lens holding cylinder 312 is a member for holding the focusing lens unit L32 on its inner circumferential side, and is fitted in the inner circumferential surface of a small-diameter portion of the stationary cylinder 301 to be movable in the optical axis direction. A rotary cylinder 302 is a cylindrical member which is arranged on the outer circumferential surface of the small-diameter portion of the stationary cylinder 301 to be rotatable about the optical axis, and comprises a cam groove 302d that defines the position, in the optical axis direction, of She focusing lens unit L32. A cam pin 311 is arranged on the outer circumferential surface of the distal end portion of the lens holding cylinder 312, extends through a straight groove 301b, which is formed on the small-diameter portion of the stationary cylinder 301 and extends parallel to the optical axis, and has its distal end portion inserted into the cam groove 302d. Therefore, the cam pin 311 moves in the optical axis direction along the profile of the cam groove 302d upon rotation of the rotary cylinder 302, thus driving the lens holding cylinder 312 in the optical axis direction.

A roller 309 is a member for transmitting the moving force from an MF coupling ring 303 or an AF gear cylinder 314 (to be described later) to the rotary cylinder 302, and three rollers are arranged on the outer circumferential surface of the rotary cylinder 302 at equal angular intervals in the circumferential direction. The side surfaces, on the front and rear sides in the optical axis direction, of the rollers 309 are sandwiched between the AF gear cylinder 314 and the MF coupling ring 303. Hence, the rollers 309, the AF gear cylinder 314, and the MF coupling ring 303 constitute a so-called differential mechanism.

The AF gear cylinder 314 is a cylindrical member arranged on the outer circumferential side of the small-diameter portion of the stationary cylinder 301. The AF gear cylinder 314 has a circumferential groove 314b that rounds it once in the circumferential direction on its inner circumferential surface. The circumferential groove 314b receives a pin 313 arranged on the outer circumferential surface of the small-diameter portion of the stationary cylinder 301. Therefore, any movement, in the optical axis direction, of the AF gear cylinder 314 is inhibited by the pin 313, and the cylinder 314 performs only rotation about the optical axis. The front end face of the AF gear cylinder 314 is in frictional contact with the side surfaces of the rollers 309. Thus, when the AF gear cylinder 314 rotates, the rollers 309 rotate about their roller shafts.

A rotary gear shaft 307 is a member for transmitting the moving force from an AF power source (not shown) such as a DC motor or the like. The rotary gear shaft 307 is arranged so that its rotation axis extends parallel to the optical axis, since its distal end portion 307a is supported in a hole 301a of the stationary cylinder 301. On the other hand, the rotary gear shaft 307 has a gear portion 307b on its front portion, and the gear portion 307b meshes with an internal gear 314a formed on the inner circumferential surface of the trailing end portion of the AF gear cylinder 314. Accordingly, the rotation of the rotary gear shaft 307 is reliably transmitted to the AF gear cylinder 314.

An MF ring 304 is a cylindrical member rotated by an external operation in the MF mode, and is arranged on the outer circumferential side of the stationary cylinder 301 to be rotatable about the optical axis.

The MF coupling ring 303 is a member which is arranged on the inner circumferential surface of the MF ring 304 to be movable in the optical axis direction. The MF coupling ring 303 comprises a pin 310 on its outer circumferential surface, and the distal end portion of the pin 310 is inserted into a straight groove 304a, which is formed on the inner circumferential surface of the MF ring 304 and extends parallel to the optical axis. Therefore, the MF ring 304 and the MF coupling ring 303 are integrated in the rotational direction. The rear end face of the MF coupling ring 303 is in frictional contact with the side surfaces of the rollers 309. Hence, when the MF coupling ring 303 rotates, the rollers 309 rotate about their roller shafts.

A biasing member 308 is an elastic member such as a spring for applying the biasing force for biasing the MF coupling ring 303 backward in the optical axis direction. One end of the biasing member 308 is arranged on the stationary cylinder 301, and the other end thereof is arranged on the MF coupling ring 303. With this arrangement, since the biasing member 308 biases the MF coupling ring 303 backward in the optical axis direction, the MF coupling ring 303 and the rollers 309, and the AF gear cylinder 314 and the rollers 309 reliably contact each other, and their contact surfaces do not slip with respect to each other.

Figure 9:
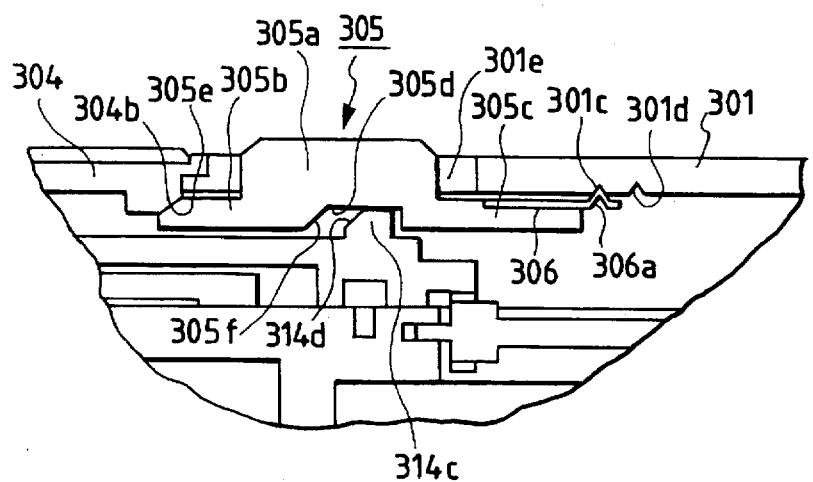
FIG. 9 is a partially enlarged sectional view of the lens barrel shown in FIG. 7.

FIG. 9 is an enlarged sectional view of a portion the third embodiment shown in FIG. 7.

An A–M switch member 305 is a member which is operated when the focusing mode is switched between the AF and MF modes in the third embodiment. The A–M switch member 305 has a projection 305a, extended portions 305b and 305c respectively extending backward and forward in the optical axis direction, and a groove portion 305d formed in the lower surface of the projection 305a. The projection 305a is inserted into a vertical hole 301e, which is formed on the stationary cylinder 301 to extend parallel to the optical axis, from the inner circumferential surface side. With this arrangement, the moving direction of the A–M switch member 305 is limited to the optical axis direction. Also, the groove portion 305d receives a projection 314c formed on the outer circumferential surface of the AF gear cylinder 314, thus preventing the projection 305a from disengaging from the vertical hole 301e.

A lock member 306 with one projection consists of an elastic member such as a leaf spring or the like, and is arranged on the rear portion of the extended portion 305c. Note that the lock member 306 locks the position, in the optical axis direction, of the A–M switch member 305 when its projection is fitted into one of two groove portions 301c and 301d, which are formed on the inner circumferential surface of the large-diameter portion of the stationary cylinder 301 to be juxtaposed in the optical axis direction. When the projection of the lock member 306 is fitted in the groove portion 301d, the A–M switch member 305 is locked at the rear position in the optical axis direction, and a surface 305f of the groove portion 305d is in frictional contact with a surface 314d of the projection 314c. On the other hand, when the projection of the lock member 306 is fitted in the groove portion 301c, the A–M switch member 305 is locked at the front position in the optical axis direction, and a surface 305e of the extended portion 305b is in frictional contact with a rear end face 304b of the MF ring 304.

The focusing operation in the AF mode according to the third embodiment will be described below with reference to FIG. 7.

In the AF mode, the A–M switch member 305 is located at the front position in the optical axis direction, and the projection of the lock member 306 is fitted into the groove portion 301c. On the other hand, since the surface 305e of the extended portion 305b is in frictional contact with the surface 304b of the MF ring 304, the MF ring 304 is fixed in position in the rotational direction.

When the focusing operation is performed in the AF mode in the third embodiment, an AF switch on the camera body side is turned on, and a power source (not shown) applies the moving force to the rotary gear shaft 307 to rotate it. The rotation of the rotary gear shaft 307 is transmitted to the AF gear cylinder 314 via the gear portion 307b and the internal gear 314a, thus rotating the AF gear cylinder 314. The rotation of the AF gear cylinder 314 is further transmitted to the rollers 309, and the rollers 309 rotate about their roller shafts. On the other hand, the MF coupling ring 303 does not rotate since it is integrated with the MF ring 304, which is fixed in position in the rotational direction by the A–M switch member 305. For this reason, the rotating rollers 309 move along the rear end face of the MF coupling ring 303, and move (revolve) around the optical axis. Since the rollers 309, the MF coupling ring 303, and the AF gear cylinder 314 constitute a differential mechanism, as described above, the rollers 309 revolve through an angle ½ the rotation angle of the MF coupling ring 303.

The revolution of the rollers 309 is transmitted to the rotary cylinder 302. Furthermore, the rotation of the rotary cylinder 302 is converted into a rectilinear motion in the optical axis direction by a cam mechanism constituted by the cam pin 311, the cam groove 302d, and the like, and is transmitted to the lens holding cylinder 312. As a result, the lens holding cylinder 312 and the focusing lens unit L12 move backward or forward in the optical axis direction, thus attaining a focusing operation of the optical system.

The focusing operation in the MF mode according to the third embodiment will be described below with reference to FIG. 8.

When the lens barrel of the third embodiment is in the MF mode, the A–M switch member 305 is located at the rear position in the optical axis direction, and the projection of the lock member 306 is fitted into the groove portion 301d. On the other hand, since the surface 305f of the groove portion 305d is in frictional contact with the surface 314d of the AF gear cylinder 314c, the AF gear cylinder 314 is fixed in position in the rotational direction.

When the MF ring 304 is rotated by an external operation, the rotation of the MF ring 304 is transmitted to the MF coupling ring 303 via the pin 310, and the MF coupling ring 303 rotates together with the MF ring 304. Furthermore, the rotation of the MF coupling ring 303 is transmitted to the rollers 309 to rotate them. On the other hand, since the AF gear cylinder 314 is fixed in position in the rotational direction by the A–M switch member 305, the rotating rollers 309 revolve along the front end face of the AF gear cylinder 314. Note that the revolution angle of the rollers 309 is ½ the rotation angle of the MF coupling ring 303 as in the AF mode.

Thereafter, the revolution of the rollers 309 is transmitted to the focusing lens unit L32 via the same route as in the AF mode, thus attaining a focusing operation.

As described above, in the third embodiment, the MF coupling ring 303, the rollers 309, and the AF gear cylinder 314 constitute a so-called differential mechanism. In the MF mode, the moving force is transmitted from the MF coupling ring 303 to the rollers 309. On the other hand, in the AF mode, the moving force is transmitted from the AF gear cylinder 314 to the rollers 309. Furthermore, the moving force is transmitted from the rollers 309 to the rotary cylinder 302, thus attaining a focusing operation. Therefore, when the focusing mode is switched between the AF and MF modes, neither an operation for meshing the gear portion 307b of the rotary gear shaft 307 with the internal gear 314a of the AF gear cylinder 314 nor an operation for releasing their meshing state are required, and the focusing mode can be smoothly switched.

At the same time, in the third embodiment, since the A–M switch member 305 is arranged, and is brought into frictional contact with the MF ring 304 or the AF gear cylinder 314 in correspondence with the selected focusing mode, the members or mechanism whose motions are to be inhibited in the selected focusing mode can be reliably locked. Therefore, for example, the focusing operation in the MF mode can be smoothly performed even when the AF power transmission system generates a small frictional force or when a motor having a small holding torque is used as the AF power source. As a result, in this embodiment, a compact motor such as a DC motor or the like, which has a small holding torque and also generates a small driving force, can be used as the AF power source, and a lens barrel which can reduce cost and consumption power, and has good switching operability of the focusing modes can be provided.

Figure 11:
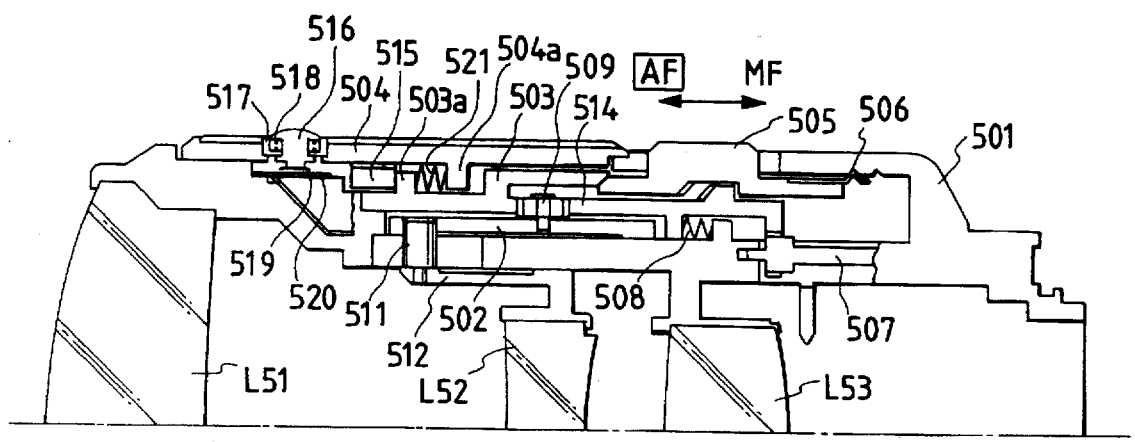
FIG. 11 is a sectional view showing a lens barrel in the AF mode according to the fourth embodiment of the present invention.
Figure 12:
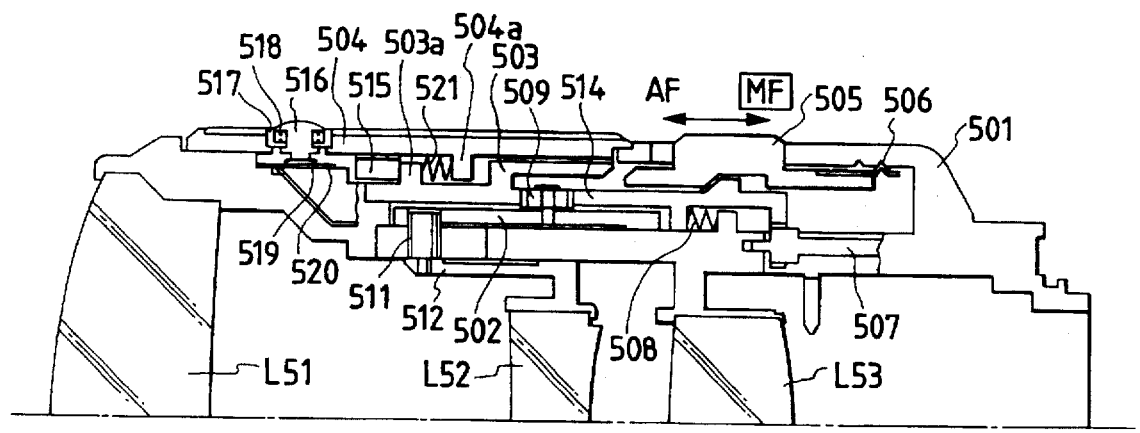
FIG. 12 is a sectional view showing the lens barrel in the MF mode according to the fourth embodiment of the present invention.
Figure 13:
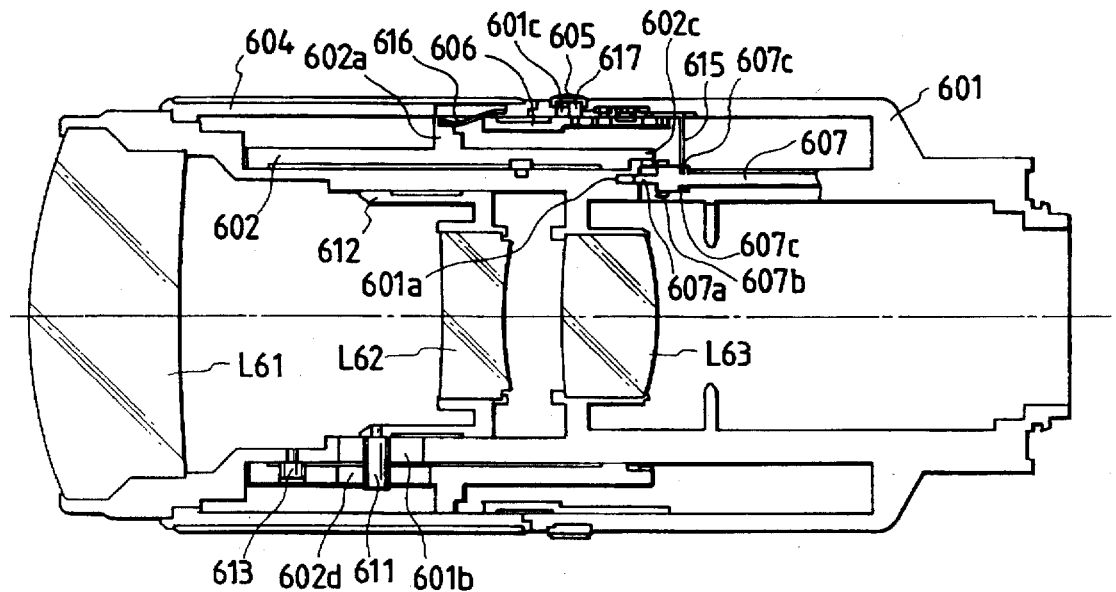
FIG. 13 is a sectional view showing a conventional lens barrel in the MF mode according the first example.
Figure 14:
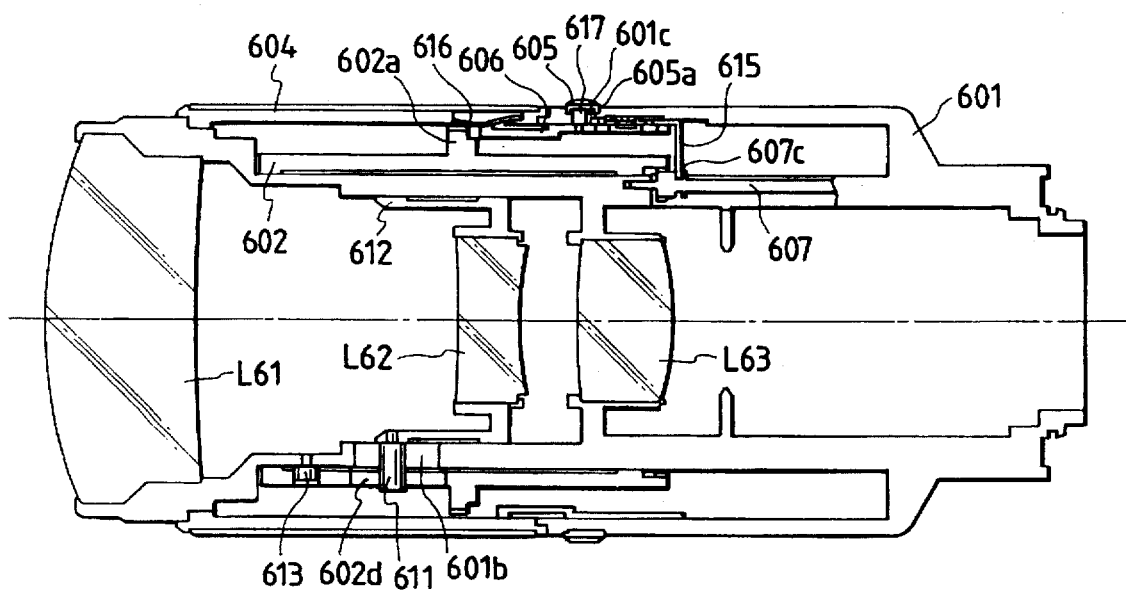
FIG. 14 is a sectional view showing the conventional lens barrel in the AF mode according the first example.
Figure 15A:
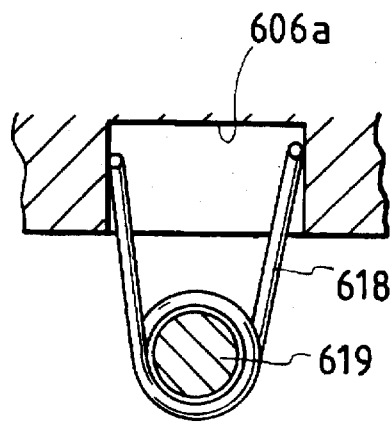
FIGS. 15A and 15B are enlarged sectional views showing the coupling portion between an A–M switch member and a movable member in the conventional lens barrel shown in FIG. 13 or 14.
Figure 15B:
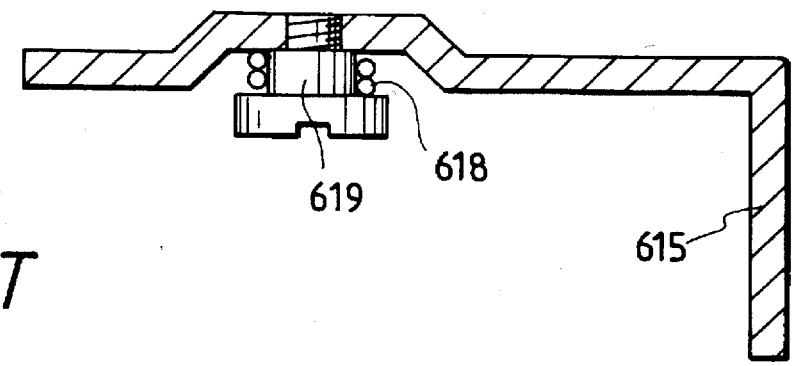
Figure 16:
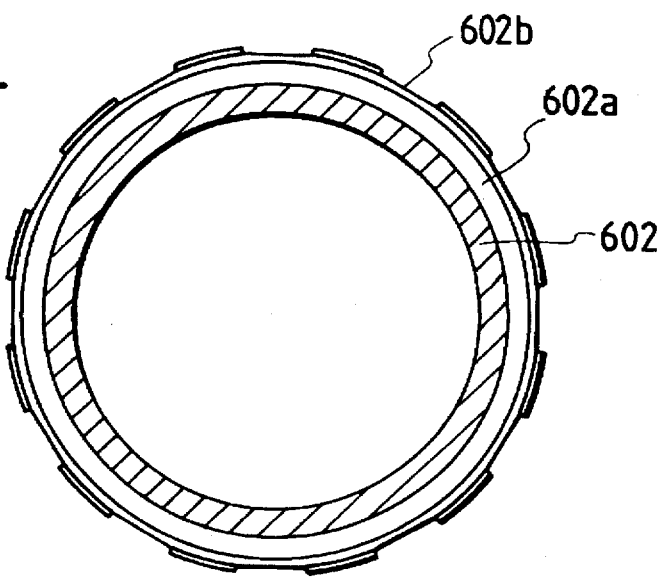
FIG. 16 is a sectional view of a rotary cylinder used in the conventional lens barrel shown in FIG. 13 taken along a plane perpendicular to the optical axis.
Figure 17:
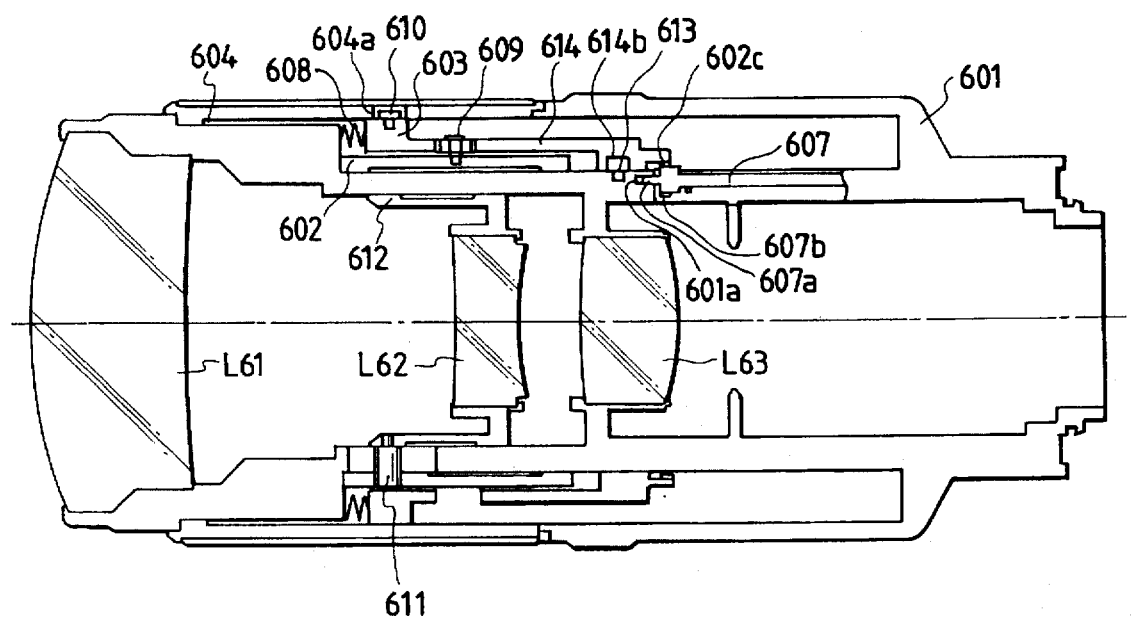
FIG. 17 is a sectional view showing a conventional lens barrel according to the second example.
Figure 18:
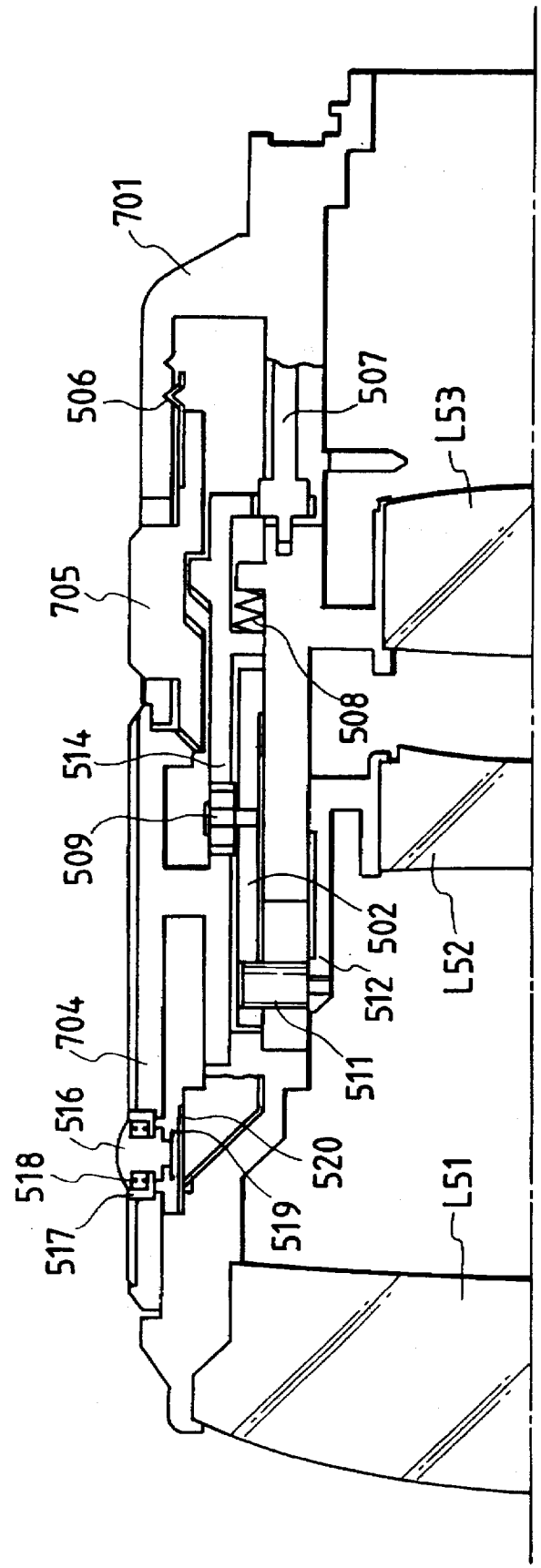
FIG. 18 is a sectional view showing a conventional lens barrel according to the third example.

FIGS. 11 and 12 are sectional views showing a lens barrel according to the fourth embodiment of the present invention. In the lens barrel shown in FIGS. 11 and 12, the same reference numerals denote the same parts as in the lens barrel shown in FIGS. 18 and 19, and a repetitive description thereof will be omitted. Therefore, portions different from the prior art will be mainly explained below.

Referring to FIG. 11, a focusing lock button 516 is arranged on a portion of an MF ring 504. A female screw is formed on the inner circumferential side of the MF ring 504. On the other hand, a friction setting ring 515 is a member formed into a ring shape, and a male screw is formed on its outer circumferential surface. The female screw of the MF ring 504 is threadably coupled to the male screw of the friction setting ring 515.

An MF rotary member 503 is arranged on the inner circumferential side of the MF ring 504. A portion of the MF rotary member 503 contacts rollers 509. A collar portion 503a is formed on a portion on the outer circumferential surface side of the MF rotary member 503, and contacts the friction setting ring 515. On the other hand, a collar portion 504a is formed on a portion on the inner circumferential surface side of the MF ring 504, and a friction spring 521 is arranged between the collar portions 503a and 504a. With this arrangement, the MF rotary member 503 is biased toward the friction setting ring 515 side, and is in frictional contact with the friction setting ring 515. Therefore, when the attached position of the friction setting ring 515 is changed, the contact force between the MF rotary member 503 and the friction setting ring 515 can be changed.

The operations in the AF and MF modes will described below.

In the AF mode, a selection switch 505 is moved toward the AF side (left side in FIG. 11), as shown in FIG. 11. With this operation, the selection switch 505 comes into contact with the MF rotary member 503, and the MF rotary member 503 is locked. In this state, when the driving force is transmitted from the camera body side to a driving force transmission member 507, an AF rotary member 514 is rotated, and the rollers 509 roll around the optical axis. As a result, a focusing rotary member 502 is rotated to attain a focusing operation. During this operation, the MF rotary member 503 is kept locked. Therefore, the MF ring 504 does not rotate.

In this AF mode, the focusing state is often held by pressing the focusing lock button 516. In this case, the focusing lock button 516 can be located at an arbitrary position by rotating the MF ring 504.

More specifically, in the AF mode, the MF ring 504 is in frictional contact with the MF rotary member 503 and is locked at a predetermined position. However, when the rotating force is applied to the MF ring 504 by a rotation torque exceeding the still frictional force between the MF ring 504 and the MF rotary member 503, only the MF ring 504 can be rotated.

In the MF mode, as shown in FIG. 12, the selection switch 505 is moved to the MF side (right side in FIG. 12). With this operation, the contact state between the selection switch 505 and the MF rotary member 503 is released, and in turn, the selection switch 505 comes into contact with the AF rotary member 514, thus locking the AF rotary member 514. In this state, when the MF ring 504 is manually rotated, since the static frictional force of the friction spring 521 acts between the MF ring 504 and the MF rotary member 503, the MF rotary member 503 rotates together with the MF ring 504. With this operation, the rollers 509 roll around the optical axis, and the focusing rotary member 502 rotates, thus attaining a focusing operation. During this operation, the AF rotary member 514 is kept locked.

As can be seen from the above-mentioned operations, a torque TL required for rotating the MF ring 504 with respect to the MF rotary member 503 when the MF rotary member 503 is locked in the AF mode, and a torque TM required for rotating the MF ring 504 together with the MF rotary member 503 in the MF mode must be set so that TL>TM holds. The frictional force between the MF ring 504 and the MF rotary member 503 can be set by adjusting the position of the friction setting ring 515 so the above relation holds.

Note that the present invention is not limited to the above-mentioned specific embodiments.

1) For example, in each of the first to third embodiments, the A–M switch member 105, 205, or 305 is in frictional contact with the MF ring 104, 204, or 304 to lock the MF coupling ring 103, 203, or 303 in the rotational direction. Alternatively, the A–M switch member 105, 205, or 305 may be in direct frictional contact with the MF coupling ring 103, 203, or 303 to inhibit the rotation of the MF coupling ring 103, 203, or 303.

2) In each of the first to third embodiments, the A–M switch member 105, 205, or 305 and the AF gear cylinder 114, 214, or 314, and the A–M switch member 105, 205, or 305 and the MF ring 104, 204, or 304 are in frictional contact with each other. In this case, the A–M switch member 105, 205, or 305 need only reliably lock the AF gear cylinder 114, 214, or 314 or the MF ring 104, 204, or 304 in the rotational direction, and hence, gears may be formed on their contact surfaces, and may mesh with each other.

3) Furthermore, in the first embodiment, the A–M switch member 105 locks the MF ring 104 in the AF mode. However, if the load given from the power transmission system (from the MF ring 104 to the rollers 109) to the rotary cylinder 102 is sufficiently small, the MF ring 104 may be free to rotate.

4) Moreover, in the first embodiment, the A–M switch member 105 releases the meshing state between the gear portion 107b and the internal gear 102c in the MF mode. However, if the load given from the AF power transmission system (from the AF power source to the rotary gear shaft 107) to the rotary cylinder 102 is sufficiently small, the meshing state need not always be released.

Figure 10:
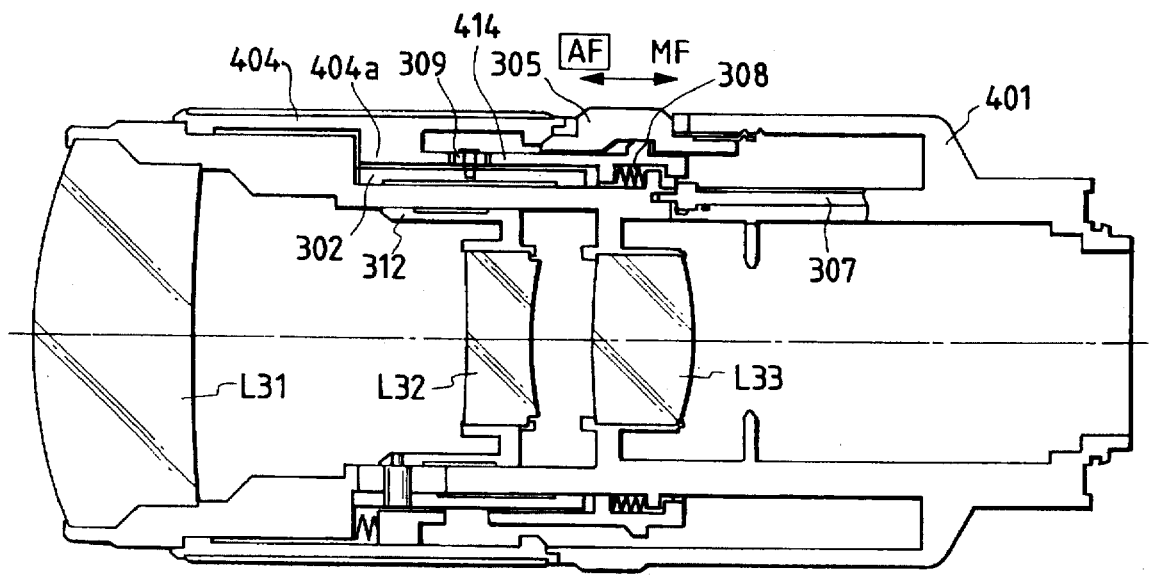
FIG. 10 is a sectional view showing a lens barrel according to a modification of the third embodiment of the present invention.

5) In the third embodiment, the MF ring 304 and the MF coupling ring 303 are two independent members. Alternatively, these members may be replaced by a single member which has portions corresponding to the functions of the MF ring 304 and the MF coupling ring 303. FIG. 10 shows such example. An MF ring 404 comprises a projection 404a on its inner circumferential surface, and the projection 404a has a function corresponding to the MF coupling ring 303. In the example shown in FIG. 10, an AF gear cylinder 414 is movable in the optical axis direction, so that the projection 404a and the rollers 309, and the rollers 309 and the AF gear cylinder 414 can reliably contact each other, and the biasing member 308 is arranged between a stationary cylinder 401 and the AF gear cylinder 414 to bias the AF gear cylinder 414 forward in the optical axis direction.

Therefore, it is intended that the invention not be limited to the preferred embodiments described herein, but that the invention will include all embodiments falling within the scope of the appended claims.

What is claimed is:

1. A lens barrel comprising:

a manual focusing ring which is rotatable about an optical axis so as to attain a manual focusing operation;

a focusing rotary cylinder which defines a position, in an optical axis direction, of a focusing optical system, and is rotatable about the optical axis;

an auto-focusing power transmission member for directly transmitting a moving force from an auto-focusing power source to said focusing rotary cylinder;

a free rotation cylinder which is arranged on said focusing rotary cylinder, and is rotatable about the optical axis;

a manual focusing power transmission member for transmitting a moving force from said manual focusing ring;

a power relaying member which constitutes a differential mechanism together with said manual focusing power transmission member and said free rotation cylinder, and applies a rotation driving force to said focusing rotary cylinder by receiving the moving force transmitted from said manual focusing power transmission member; and a locking member for locking said free rotation cylinder in the manual focusing operation.

2. A lens barrel according to claim 1, wherein said locking member locks said free rotation cylinder by being in frictional contact with said free rotation cylinder.

3. A lens barrel comprising:

a manual focusing ring which is rotatable about an optical axis so as to attain a manual focusing operation;

a focusing rotary cylinder which defines a position, in an optical axis direction, of a focusing optical system, and is rotatable about the optical axis;

an auto-focusing power transmission member for directly transmitting a moving force from an auto-focusing power source to said focusing rotary cylinder;

a free rotation cylinder which is arranged on said focusing rotary cylinder, and is rotatable about the optical axis;

a manual focusing power transmission member for transmitting a moving force from said manual focusing ring;

a power relaying member which constitutes a differential mechanism together with said manual focusing power transmission member and said free rotation cylinder, and applies a rotation driving force to said focusing rotary cylinder by receiving the moving force transmitted from said manual focusing power transmission member; and a switch member for switching a focusing operation between the manual focusing operation and an auto-focusing operation, wherein said switch member disengages said auto-focus power transmission member and said focusing rotary cylinder and locks said free rotation cylinder when the focusing operation is switched to the manual focusing operation, and said switch member locks said manual focusing power transmission member via said manual focusing ring when the focusing operation is switched to the auto-focusing operation.

4. A lens barrel according to claim 3, wherein said switch member is selectively in frictional contact with said free rotation cylinder and said manual focusing ring, thereby locking a corresponding one of said free rotation cylinder and said manual focusing power transmission member.

5. A lens barrel comprising:

a stationary cylinder for holding a stationary optical system;

a manual focusing ring which is rotatable about an optical axis so as to attain a manual focusing operation;

a focusing rotary cylinder which defines a position, in an optical axis direction, of a focusing optical system, and is rotatable about the optical axis;

an auto-focusing power transmission member for directly transmitting a moving force from an auto-focusing power source to said focusing rotary cylinder;

a manual focusing power transmission member for transmitting a moving force from said manual focusing ring;

a power relaying member which constitutes a differential mechanism together with said manual focusing power transmission member and said stationary cylinder, and applies a rotation driving force to said focusing rotary cylinder by receiving the moving force transmitted from said manual focusing power transmission member; and a switch member for switching a focusing operation between the manual focusing operation and an auto-focusing operation, wherein said switch member disengages said auto-focus power transmission member and said focusing rotary cylinder when the focusing operation is switched to the manual focusing operation, and said switch member disengages said manual focusing power transmission member and said power relaying member from each other by biasing said manual focusing power transmission member when the focusing operation is switched to the auto-focusing operation.

6. A lens barrel according to claim 5, wherein said manual focusing power transmission member is movable relative to said manual focusing ring in the optical axis direction, and said switch member disengages said manual focusing power transmission member and said power relaying member from each other by biasing said manual focusing power transmission member in the optical axis direction.

7. A lens barrel comprising:

a manual focusing ring which is rotatable about an optical axis so as to attain a manual focusing operation;

a focusing rotary cylinder which defines a position, in an optical axis direction, of a focusing optical system, and is rotatable about the optical axis;

a manual focusing power transmission member for transmitting a moving force from said manual focusing ring;

an auto-focusing power transmission member for transmitting a moving force from an auto-focusing power source;

a power relaying member which constitutes a differential mechanism together with said manual focusing power transmission member and said auto-focusing power transmission member, and applies a rotation driving force to said focusing rotary cylinder by receiving the moving forces transmitted from said manual focusing power transmission member and said auto-focusing power transmission member; and a switch member for switching a focusing operation between the manual focusing operation and an auto-focusing operation, wherein said switch member locks said auto-focusing power transmission member when the focusing operation is switched to the manual focusing operation, and said switch member locks said manual focusing power transmission member via said manual focusing ring when the focusing operation is switched to the auto-focusing operation.

8. A lens barrel according to claim 7, wherein said switch member is selectively in frictional contact with said auto-focusing power transmission member and said manual focusing ring, thereby locking a corresponding one of said auto-focusing power transmission member and said manual focusing power transmission member.

9. A lens barrel according to claim 7, wherein said manual focusing ring and said manual focusing power transmission member are integrally formed.

10. A lens barrel comprising:

a manual focusing ring which is rotatable about an optical axis so as to attain a manual focusing operation;

a focusing rotary cylinder which defines a position, in an optical axis direction, of a focusing optical system, and is rotatable about the optical axis;

a focusing lock member which is arranged on said manual focusing ring, is rotatable together with said manual focusing ring upon rotation of said manual focusing ring, and holds a focusing state; and a switch member for switching a focusing operation between the manual focusing operation and an auto-focusing operation, wherein when the focusing operation is switched to the auto-focusing operation, said manual focusing ring is not rotated by the auto-focusing operation, and is manually rotatable.

11. A lens barrel according to claim 10, further comprising:

a manual focusing power transmission member which is in frictional contact with said manual focusing ring to be rotatable about the optical axis, is rotatable together with said manual focusing ring by a frictional contact force with said manual focusing ring when the focusing operation is switched to the manual focusing operation, and is locked to make only said manual focusing ring rotatable when the focusing operation is switched to the auto-focusing operation.

12. A lens barrel according to claim 11, further comprising:

an auto-focusing power transmission means which is rotated about the optical axis when the focusing operation is switched to the auto-focusing operation, and is locked when the focusing operation is switched to the manual focusing operation; and a power relaying member which constitutes a differential mechanism together with said manual focusing power transmission member and said auto-focusing power transmission member, and applies a rotation driving force to said focusing rotary cylinder by receiving the moving forces from said manual focusing power transmission member and said auto-focusing power transmission member.

13. A lens barrel according to claim 12, wherein said power relaying member is in frictional contact with said manual focusing power transmission member and said auto-focusing power transmission member, and rolls around the optical axis without slipping with respect to said manual focusing power transmission member and said auto-focusing power transmission member when one of said manual focusing power transmission member and said auto-focusing power transmission member is rotated.

* * * * *

UNITED STATES PATENT AND TRADEMARK OFFICE
CERTIFICATE OF CORRECTION

PATENT NO. : 5,701,209
DATED : December 23, 1997
INVENTOR(S) : Koushi YOSHIBE, et al.

It is certified that error appears in the above-identified patent and that said Letters Patent is hereby corrected as shown below:

On the title page: Item [54] and Column 1, line 1, in the title change "MANUALLY" to --MANUAL--.

Title Page, [75] Inventors, change "Koushi Yoshibe; Hideo Kanno, both of Chiba, Japan" to --Koushi Yoshibe, Kawasaki; Hideo Kanno, Chiba, both of Japan--

Signed and Sealed this

Thirty-first Day of March, 1998

Attest:

BRUCE LEHMAN

Attesting Officer  Commissioner of Patents and Trademarks